(12) United States Patent
Zahnert et al.

(10) Patent No.: US 12,211,271 B2
(45) Date of Patent: *Jan. 28, 2025

(54) ENHANCED POSE DETERMINATION FOR DISPLAY DEVICE

(71) Applicant: Magic Leap, Inc., Plantation, FL (US)

(72) Inventors: Martin Georg Zahnert, Zurich (CH); Joao Antonio Pereira Faro, Lausanne (CH); Miguel Andres Granados Velasquez, Thalwil (CH); Dominik Michael Kasper, Zurich (CH); Ashwin Swaminathan, Dublin, CA (US); Anush Mohan, Mountain View, CA (US); Prateek Singhal, Mountain View, CA (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,086

(22) Filed: Oct. 9, 2023

(65) Prior Publication Data

US 2024/0135707 A1  Apr. 25, 2024
US 2024/0233372 A9  Jul. 11, 2024

Related U.S. Application Data

(63) Continuation of application No. 17/966,585, filed on Oct. 14, 2022, now Pat. No. 11,823,450, which is a
(Continued)

(51) Int. Cl.
*G09G 5/00* (2006.01)
*G02B 27/01* (2006.01)
(Continued)

(52) U.S. Cl.
CPC ........... *G06V 20/20* (2022.01); *G02B 27/017* (2013.01); *G06F 3/012* (2013.01);
(Continued)

(58) Field of Classification Search
CPC ......... G06T 19/006; G06T 19/00; G06T 7/74; G06T 7/94; G06T 11/00;
(Continued)

(56) References Cited

U.S. PATENT DOCUMENTS 5,892,855 A  4/1999 Kakinami et al.
6,850,221 B1  2/2005 Tickle
(Continued)

FOREIGN PATENT DOCUMENTS

JP     H0995194 A    4/1997
WO  WO 2019118886 A1  6/2019

OTHER PUBLICATIONS

ARToolKit:https://web.archive.org/web/20051013062315/http:www.hitl.washington.edu:80/artoolkit/documentation/hardware.htm, archived Oct. 13, 2005.
(Continued)

*Primary Examiner* — Gordon G Liu
(74) *Attorney, Agent, or Firm* — Seed IP Law Group LLP

(57) ABSTRACT

To determine the head pose of a user, a head-mounted display system having an imaging device can obtain a current image of a real-world environment, with points corresponding to salient points which will be used to determine the head pose. The salient points are patch-based and include: a first salient point being projected onto the current image from a previous image, and with a second salient point included in the current image being extracted from the current image. Each salient point is subsequently matched with real-world points based on descriptor-based map information indicating locations of salient points in the real-
(Continued)

world environment. The orientation of the imaging devices is determined based on the matching and based on the relative positions of the salient points in the view captured in the current image. The orientation may be used to extrapolate the head pose of the wearer of the head-mounted display system.

29 Claims, 23 Drawing Sheets

Related U.S. Application Data continuation of application No. 17/193,568, filed on Mar. 5, 2021, now Pat. No. 11,501,529, which is a continuation of application No. 16/221,065, filed on Dec. 14, 2018, now Pat. No. 10,943,120.

(60) Provisional application No. 62/623,606, filed on Jan. 30, 2018, provisional application No. 62/599,620, filed on Dec. 15, 2017.

(51) Int. Cl.
G06F 3/01 (2006.01)
G06F 3/04815 (2022.01)
G06V 20/20 (2022.01)
G06V 40/18 (2022.01)

(52) U.S. Cl.
CPC .......... *G06F 3/04815* (2013.01); *G06V 40/18* (2022.01); *G02B 2027/0178* (2013.01)

(58) Field of Classification Search
CPC . G06T 2207/10012; G06T 2207/20021; G06F 3/011; G06F 3/012; G06F 3/04815; G02B 27/017; G02B 1/041; G02B 2027/0178; H04L 67/52; H04N 7/152; G06V 20/20
USPC ........................................ 345/633
See application file for complete search history.

(56) References Cited

U.S. PATENT DOCUMENTS

| | | | |
|---|---|---|---|
| 9,081,426 B2 | 7/2015 | Armstrong | |
| 9,215,293 B2 | 12/2015 | Miller | |
| 9,348,143 B2 | 5/2016 | Gao et al. | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| 9,740,006 B2 | 8/2017 | Gao | |
| 9,791,700 B2 | 10/2017 | Schowengerdt | |
| 9,851,563 B2 | 12/2017 | Gao et al. | |
| 9,857,591 B2 | 1/2018 | Welch et al. | |
| 9,874,749 B2 | 1/2018 | Bradski et al. | |
| 10,943,120 B2 | 3/2021 | Zahnert et al. | |
| 2006/0028436 A1 | 2/2006 | Armstrong | |
| 2007/0081123 A1 | 4/2007 | Lewis | |
| 2007/0248243 A1 | 10/2007 | Ko et al. | |
| 2012/0127062 A1 | 5/2012 | Bar-Zeev et al. | |
| 2012/0162549 A1 | 6/2012 | Gao et al. | |
| 2012/0169887 A1* | 7/2012 | Zhu ........................ | G06V 40/20 348/207.1 |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2013/0342671 A1* | 12/2013 | Hummel .............. | G06V 40/107 348/77 |
| 2014/0010407 A1 | 1/2014 | Sinha et al. | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0267420 A1 | 9/2014 | Schowengerdt et al. | |
| 2014/0306866 A1 | 10/2014 | Miller et al. | |
| 2014/0368645 A1 | 12/2014 | Ahuja et al. | |
| 2015/0016777 A1 | 1/2015 | Abovitz et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0286873 A1* | 10/2015 | Davis .................... | G06F 1/1694 382/103 |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0346490 A1 | 12/2015 | Tekolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2019/0188474 A1 | 6/2019 | Zahnert et al. | |

OTHER PUBLICATIONS

Azuma, "A Survey of Augmented Reality," *In Presence: Teleoperators and Virtual Environments* 6(4):355-385, http://www.cs.unc.edu/~azuma, Aug. 1997.

Azuma, "Predictive Tracking for Augmented Reality," Dissertation, TR95-007, Doctor of Philosophy, Department of Computer Science, UNC—Chapel Hill, NC, Feb. 1995. (262 pages).

Bimber, et al., "Spatial Augmented Reality—Merging Real and Virtual Worlds," 2005 <https://web.media.mit.edu/~raskar/book/BimberRaskarAugmentedRealityBook.pdf>.

International Preliminary Report on Patentability, dated Jun. 16, 2020, for Application No. PCT/US2018/065771.

International Search Report and Written Opinion, dated Feb. 26, 2019, for Application No. PCT/US2018/065771.

Jacob, "Eye Tracking in Advanced Interface Design," in Woodrow Barfield and Thomas A Furness III, Virtual Environments and Advanced Interface Design, Oxford Academic, https://doi.org/10.1093/oso/9780195075557.003.0015, Jul. 1995.

Maidi et al., "Natural Feature Tracking on a Mobile Handheld Tablet," *2013 IEEE International Conference on Signal and Image Processing Applications (ICSIPA)*, Melaka, Malaysia, Oct. 8-10, 2013, pp. 246-251.

Paiva et al., "Detection of Salient Image Points using Principal Subspace Manifold Structure," *2010 20th International Conference on Pattern Recognition*, Istanbul, Turkey, Aug. 23-26, 2010.

Simo-Serra et al., "Discriminative Learning of Deep Convolutional Feature Point Descriptors," *2015 IEEE International Conference on Computer Vision (ICCV)*, Santiago, Chile, Dec. 7-13, 2015.

Singhal et al., "Multi-modal Tracking for Object based SLAM," *Institute of Robotics and Intelligent Machines*, Georgia Institute of Technology, Atlanta, Georgia, USA, Mar. 14, 2016. (8 pages).

Tanriverdi et al., "Interacting With Eye Movements in Virtual Environments," ACM CHI 200 Human Factors in Computing Systems Conference, Tufts University, Medford, MA, 2000, pp. 265-272, Addison-Wesley/ACM Press, 2000.

Uchiyama et al., "Object Detection and Pose Tracking for Augmented Reality: Recent Approaches," Nov. 14, 2012, Retrieved from the Internet: https://hal.inria.fr/hal-00751704/document [retrieved on Jul. 13, 2021]. (9 pages).

* cited by examiner

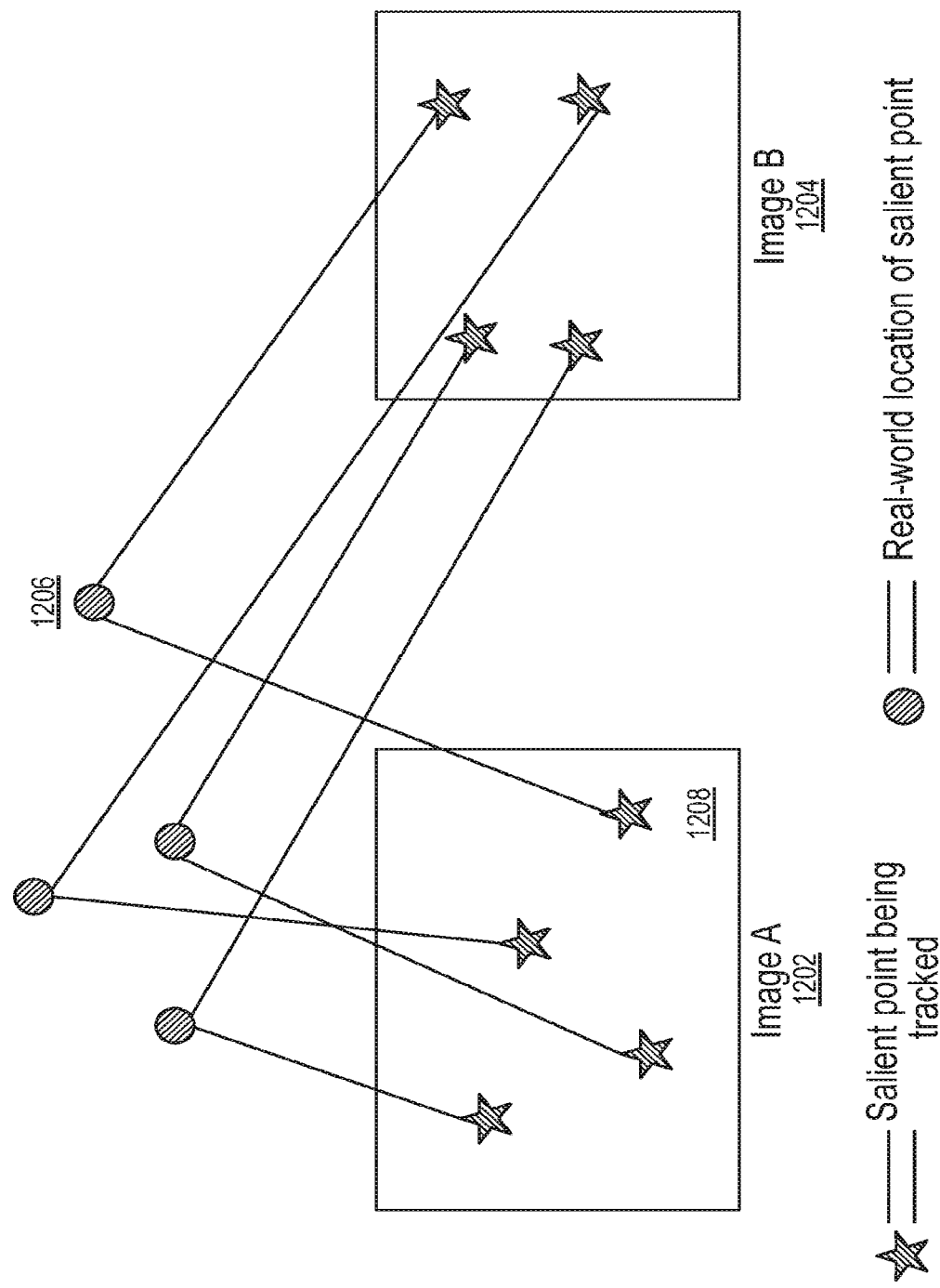

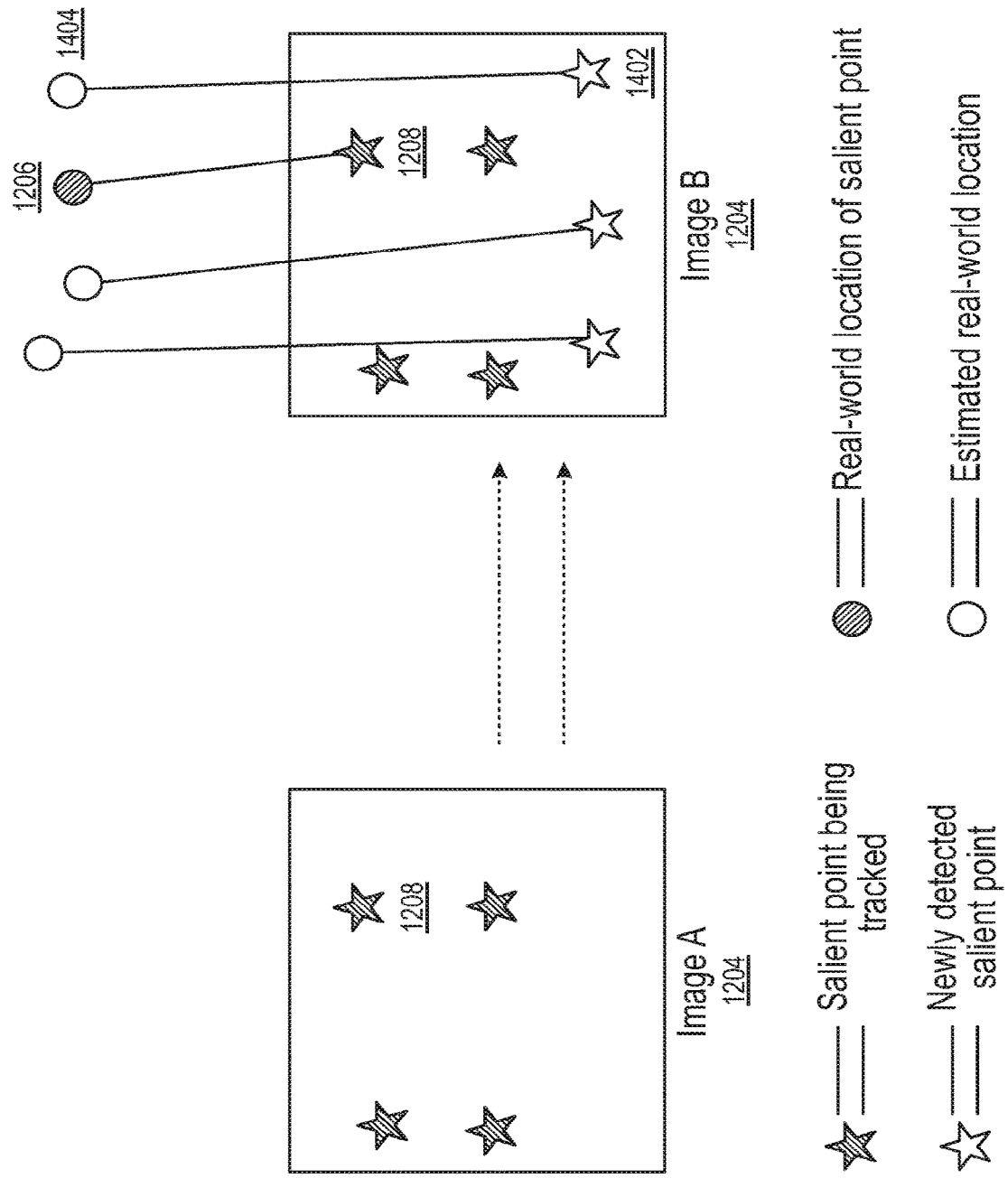

ENHANCED POSE DETERMINATION FOR DISPLAY DEVICE

INCORPORATION BY REFERENCE

This application is a continuation application of U.S. patent application Ser. No. 17/966,585, filed Oct. 14, 2022, which is a continuation of U.S. patent application Ser. No. 17/193,568, filed Mar. 5, 2021, now U.S. Pat. No. 11,501,529, which is a continuation of U.S. patent application Ser. No. 16/221,065, filed Dec. 14, 2018, now U.S. Pat. No. 10,943,120, which claims priority to U.S. Prov. App. 62/599,620, filed Dec. 15, 2017, and U.S. Prov. App. 62/623,606, filed Jan. 30, 2018. Each of these applications is hereby incorporated by reference in its entirety.

This application further incorporates by reference the entirety of each of the following patent applications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; U.S. application Ser. No. 14/331,218 filed on Jul. 14, 2014, published on Oct. 29, 2015 as U.S. Publication No. 2015/0309263; U.S. application Ser. No. 14/205,126, filed Mar. 11, 2014, published on Oct. 16, 2014 as U.S. Publication No. 2014/0306866; U.S. application Ser. No. 15/597,694, filed on May 17, 2017; and U.S. application Ser. No. 15/717,747, filed on Sep. 27, 2017.

BACKGROUND

Field

The present disclosure relates to display systems and, more particularly, to augmented reality display systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

Some non-limiting embodiments include a system comprising one or more imaging devices, one or more processors, and one or more computer storage media storing instructions that, when executed by the one or more processors, cause the one or more processors to perform operations. The operations comprise obtaining, via the one or more imaging devices, a current image of a real-world environment, the current image including a plurality of points for determining pose; projecting a patch-based first salient point from a previous image onto a corresponding one of the plurality of points in the current image; extracting a second salient point from the current image; providing respective descriptors for the salient points; matching salient points associated with the current image with real world locations specified in a descriptor-based map of the real-world environment; and determining, based on the matching, a pose associated with the system, the pose indicating at least an orientation of the one or more imaging devices in the real-world environment.

In the above embodiments, the operations may further comprise adjusting a position of the patch-based first salient point on the current image, where adjusting the position comprises: obtaining a first patch associated with the first salient point, the first patch including a portion of the previous image encompassing the first salient point and an area of the previous image around the first salient point; and locating a second patch in the current image similar to the first patch, wherein the first salient point is positioned in a similar location within the second patch as the first patch. Locating the second patch may comprise minimizing a difference between the first patch in the previous image and the second patch in the current image. Projecting the patch-based first salient point onto the current image may be based, at least in part, on information from an inertial measurement unit of the system. Extracting the second salient point may comprise: determining that an image area of the current image has less than a threshold number of salient points projected from the previous image; and extracting one or more descriptor-based salient points from the image area, the extracted salient points including the second salient point. The image area may comprise an entirety of the current image, or the image comprises a subset of the current image. The image area may comprise a subset of the current image, and the system may be configured to adjust a size associated with the subset based on one or more of processing constraints or differences between one or more prior determined poses. Matching salient points associated with the current image with real world locations specified in the map of the real-world environment may comprise: accessing map information, the map information comprising real-world locations of salient points and associated descriptors; and matching descriptors for salient points of the current image with descriptors for salient points at real-world locations. The operations may further comprise: projecting salient points provided in the map information onto the current image, wherein the projection is based on one or more of an inertial measurement unit, an extended kalman filter, or visual-inertial odometry. The system may be configured to generate the map using at least the one or more imaging devices. Determining the pose may be based on the real-world locations of salient points and the relative positions of the salient points in the view captured in the current image. The operations may further comprise: generating patches associated with respective salient points extracted from the current image, such that for a subsequent image to the current image, the patches may comprise the salient points available to be projected onto the subsequent image. Providing descriptors may comprise generating descriptors for each of the salient points.

In other embodiments an augmented reality display system is provided. The augmented reality display device comprises one or more imaging devices and one or more processors. The processors are configured to obtain a current image of a real-world environment; perform frame-to-frame tracking on the current image, such that patch-based salient points included in a previous image are projected onto the current image; perform map-to-frame tracking on the current image, such that descriptor-based salient points included in a map database are matched with salient points of the current image; and determine a pose associated with the display device.

In the above embodiments, frame-to-frame tracking may further comprise refining locations of the projected patches using photometric error optimization. Map-to-frame tracking may further comprise determining descriptors for the patch-based salient points and matching the descriptors for the salient points with descriptor-based salient points in the map database. The one or more processors may be further configured to generate the map database using at least the one or more imaging devices. The augmented reality display system may further comprise a plurality of waveguides configured to output light with different wavefront divergence corresponding to different depth planes, with the output light located at least in part based on the pose associated with the display device.

In other embodiments, a method is provided. The method comprises obtaining, via one or more imaging devices, a current image of a real-world environment, the current image including a plurality of points for determining pose; projecting a patch-based first salient point from a previous image onto a corresponding one of the plurality of points in the current image; extracting a second salient point from the current image; providing respective descriptors for the salient points; matching salient points associated with the current image with real-world locations specified in a descriptor-based map of the real-world environment; and determining, based on the matching, a pose associated with a display device, the pose indicating at least an orientation of the one or more imaging devices in the real-world environment.

In these embodiments, the method may further comprise adjusting a position of the patch-based first salient point on the current image, where adjusting the position comprises: obtaining a first patch associated with the first salient point, the first patch including a portion of the previous image encompassing the first salient point and an area of the previous image around the first salient point; and locating a second patch in the current image similar to the first patch, wherein the first salient point is positioned in a similar location within the second patch as the first patch. Locating the second patch may comprise determining a patch in the current image with a minimum of differences with the first patch. Projecting the patch-based first salient point onto the current image may be based, at least in part, on information from an inertial measurement unit of the display device. Extracting the second salient point may comprise: determining that an image area of the current image has less than a threshold number of salient points projected from the previous image; and extracting one or more descriptor-based salient points from the image area, the extracted salient points including the second salient point. The image area may comprise an entirety of the current image, or the image may comprise a subset of the current image. The image area may comprise a subset of the current image, and the processors may be configured to adjust a size associated with the subset based on one or more of processing constraints or differences between one or more prior determined poses. Matching salient points associated with the current image with real world locations specified in the map of the real-world environment may comprise: accessing map information, the map information comprising real-world locations of salient points and associated descriptors; and matching descriptors for salient points of the current image with descriptors for salient points at real-world locations. The method may further comprise projecting salient points provided in the map information onto the current image, wherein the projection is based on one or more of an inertial measurement unit, an extended kalman filter, or visual-inertial odometry. Determining the pose may be based on the real-world locations of salient points and the relative positions of the salient points in the view captured in the current image. The method may further comprise generating patches associated with respective salient points extracted from the current image, such that for a subsequent image to the current image, the patches comprise the salient points available to be projected onto the subsequent image. Providing descriptors may comprise generating descriptors for each of the salient points. The method may further comprise generating the map using at least the one or more imaging devices.

BRIEF DESCRIPTION OF THE DRAWINGS

FIG. 12A illustrates examples of a previous image and a current image.

FIG. 14A illustrates examples of a previous image and a current image.

DETAILED DESCRIPTION

Display systems, such as augmented reality (AR) or virtual reality (VR) display systems, can present content to a user (or viewer) in differing areas of the user's field of view. For example, an augmented reality display system may present virtual content to the user, which to the user can appear to be placed in a real-world environment. As another example, a virtual reality display system can present content via displays, such that the content can appear to be three-dimensional to the user and placed within a three-dimensional environment. The placement of this content, for example with respect to the user, can positively or negatively affect the realism associated with the presented content, and the user's comfort in wearing the display system. Since the placement of content can be dependent on a head pose of users of the display systems, as will be described below, these display systems can be enhanced via utilization of accurate schemes to determine head pose.

The pose of the user's head may be understood to be the orientation of the user's head (e.g., the pitch, yaw, and/or roll of the head) with respect to a real-world environment, e.g. with respect to a coordinate system associated with the real-world environment. In some embodiments, display system may also have a pose corresponding to a particular orientation of the display system (e.g., an AR or VR display device) or parts of the display system with respect to a real-world environment, e.g. with respect to a coordinate system associated with the real-world environment. The pose can optionally generically represent an orientation in the real-world environment with respect to the coordinate system. For example, if the user rotates a display system mounted on his/her head (e.g., by rotating his/her head), the pose of both the user's head and the display system can be adjusted according to the rotation. Therefore, content being presented to the user can be adjusted based on the pose of the user's head, which may also change a pose of a display of a display system mounted on the user's head. In some embodiments, the pose of the display system may be determined, and the user's head pose may be extrapolated from this display system pose. By determining head pose, as the user moves about a real-world environment, content can be realistically adjusted in location and orientation based on determined poses of the user's head. Some examples are described below.

Figure 1:
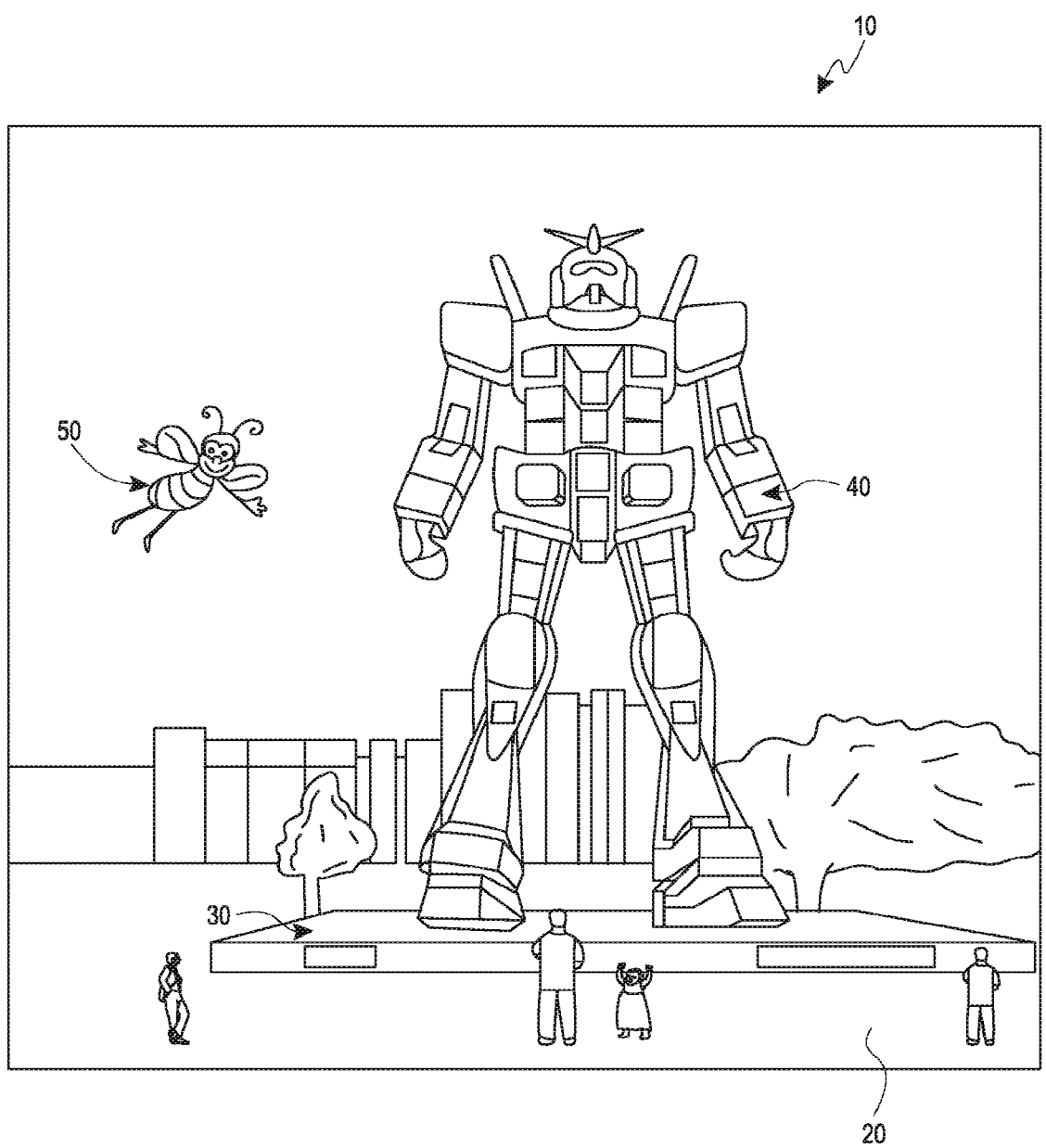
FIG. 1 illustrates a user's view of augmented reality (AR) through an AR device.

With respect to augmented reality (AR) and virtual reality (VR) display systems, realism can be enhanced if a user can move around presented virtual content, and the presented virtual content can appear to remain substantially in a fixed real-world location. For example, the robot 40 statue illustrated in FIG. 1 can be virtual content presented to the user. As the user walks towards, or around, the robot 40, the augmented reality scene 10 will appear more realistic to the user if the robot 40 appears to remain in a same location in the park. Thus, the user can view different perspectives of the robot 40, different portions of the robot 40, and so on. To ensure that the robot 40 appears as a fixed realistic statue, the display system can utilize determined poses when rendering the virtual content. For example, the display system can obtain information indicating that the user rotated his/her head at a particular angle. This rotation can inform placement of the virtual content, such that the robot 40 will appear to remain standing upright as a statue.

As another example, a user may play a first person video game while wearing a display system. In this example, the user may rapidly lower his/her head, or rotate his/her head, to move out of the way of a virtual enemy object being hurled at the user, as presented to the user via the display system. This movement (e.g., lowering or rotation of the head) can be tracked, and head poses of the user may be determined. In this way, the display system can determine whether the user successfully avoided the enemy object.

Systems for determining pose can be complicated. An example scheme to determine head pose can utilize sensors and emitters of light. For example, infra-red emitters may emit pulses of infra-red light from fixed locations in a real-world environment (e.g., the emitters may be in a room surrounding the device). A display device worn by a user can include sensors to detect these pulses. The display device can thus determine its orientation with respect to the fixed emitters. Similarly, the display device can determine its position in the real-world environment based on the fixed emitters. As another example, a display device may include fixed emitters of light (e.g., visible or infra-red light), and one or more cameras may be positioned in a real-world environment that track the emission of light. In this example, as the display device rotates, the cameras can detect that the emission of light is rotating from an initial position. These example schemes can therefore require complex hardware to determine poses of a display device.

A display system described herein (e.g., the display system 60 illustrated in FIG. 9D) can determine accurate pose estimations without the complexity and rigidity of fixed emitters of light. In some embodiments, a pose of a display system worn by a user (e.g., display 70 coupled to frame 80 as illustrated in FIG. 9D), may be determined. From the display system pose, head pose of the user may be determined. The display system can determine its pose without requiring a user to set up complex hardware in a room, and without requiring the user to remain in that room. As will be described, the display system can determine its pose through use of an imaging device (e.g., an optical imaging device such as a camera) on the display system. The imaging device can obtain images of a real-world environment, and based on these images the display system can determine its pose. Via the techniques described herein, the display system can advantageously determine pose while limiting processing and memory requirements. In this way, display systems with limited memory and compute budgets, such as AR and MR display systems, can efficiently determine pose estimations and increase realism for users.

To determine pose, the display system can leverage both (1) patch-based tracking of distinguishable points (e.g., distinctive isolated portions of an image) between successive images (referred to herein as 'frame-to-frame tracking') of the environment captured by the display system, and (2) matching of points of interest of a current image with a descriptor-based map of known real-world locations of corresponding points of interest (e.g., referred to herein as "map-to-frame tracking"). In frame-to-frame tracking, the display system can track particular points of interest (herein referred to as 'salient points'), such as corners, between captured images of the real-world environment. For example, the display system can identify locations of visual points of interest in a current image, which were included in (e.g., located in) a previous image. This identification may be accomplished using, e.g., photometric error minimization processes. In map-to-frame tracking, the display system can access map information indicating real-world locations of points of interest (e.g., three-dimensional coordinates), and match points of interest included in a current image to the points of interest indicated in the map information. Information regarding the points of interest may be stored as descriptors, for example, in the map database. The display system can then calculate its pose based on the matched visual features. Generating map information will be described in more detail below, with respect to FIG. 10A. As used herein, in some embodiments, a point may refer to a discrete pixel of an image or a set of pixels corresponding to an area of an image.

As described above, to determine pose, the display system can utilize distinguishable visual features which are referred to herein as "salient points". In this specification, a salient point corresponds to any unique portion of a real-world environment which can be tracked. For example, a salient point can be a corner. A corner can represent the substantially perpendicular intersection of two lines, and may include scratches on a desk, marks on a wall, the keyboard number '7', and so on. As will be described, corners can be detected from images obtained by an imaging device according to corner detection schemes. Example corner detection schemes can include Harris corner detection, features from accelerated segment test (FAST) corner detection, and so on.

With respect to frame-to-frame tracking, the display system can track salient points from a previous image to a current image via projecting each tracked salient point from the previous image onto the current image. For example, the display system can utilize a trajectory prediction, or optionally utilize information from an inertial measurement unit, to determine an optical flow between the current image and previous image. The optical flow can represent movement of the user from a time at which the previous image was obtained, to a time at which the current image was obtained. The trajectory prediction can inform locations in the current image to which salient points included in the previous image correspond. The display system can then obtain an image portion surrounding each salient point in the previous image, known herein as a "patch", and determine a matching image portion in the current image. A patch can be, for example, an M×N pixel area surrounding each salient point in the previous image, where M and N are positive integers. To match a patch from a previous image to a current image, the display system can identify a patch in the current image which has a reduced (e.g., minimized) photometric error between the patch and the previous image patch. A salient point may be understood to be located at a particular, consistent two-dimensional image position within the patch. For example, a centroid of a matching patch in the current image can correspond to a tracked salient point. Thus, the projection from the previous image onto a current image roughly positions a salient point and associated patch within the current image, and that position may be refined, e.g., using photometric error minimization to determine the position that minimizes the pixel intensity differences between the patch and a particular area of the current image.

With respect to map-to-frame tracking, the display system can extract salient points from a current image (e.g., identify locations of the current image corresponding to new salient points). For example, the display can extract salient points from image areas of the current image that have less than a threshold number of tracked salient points (e.g., determined from frame-to-frame tracking). The display system can then match the salient points in the current image (e.g., newly extracted salient points, tracked salient points) to respective real-world locations based on descriptor-based map information. As described herein, the display system can generate a descriptor for each salient point which uniquely describes attributes (e.g., visual) of the salient point. The map information can similarly store descriptors for the real-world salient points. Based on matching descriptors, the display system can determine real-world locations of the salient points included in the current image. Thus, the display system can determine its orientation with respect to the real-world locations, and determine its pose, which can then be used to determine head pose.

It will be appreciated that use of photometric error minimization schemes can enable highly accurate tracking of salient points between images, for example through comparison of patches as described above. Indeed, sub-pixel accuracy of tracking salient points between a previous image and a current image can be achieved. In contrast, descriptors may be less accurate in tracking salient points between images, but will utilize less memory than patches for photometric error minimization. Since descriptors may be less accurate in tracking salient points between images, determined pose estimations may vary more than if photometric error minimization were used. While accurate, use of patches can require storing a patch for each salient point. Since a descriptor may be an alphanumeric value describing visual characteristics of a salient point, and/or an image area around a salient point, such as a histogram, the descriptor can be one or more orders of magnitude smaller than a patch.

Therefore, as described herein, the display device may utilize the benefits of patch-based photometric error minimization and descriptors to allow for a robust, and memory efficient, pose determination process. For example, frame-to-frame tracking can utilize patch-based photometric error minimization to accurately track salient points between images. In this way, salient points may be tracked with, for example, sub-pixel accuracy. However, over time (e.g. across multiple frames or images) small errors may be introduced, such that over a threshold number of images, drift, caused by cumulative errors in tracking salient points, may become evident. This drift can reduce the accuracy of pose determinations. Thus, in some embodiments, map-to-frame tracking can be utilized to link each salient point to a real-world location. For example, in map-to-frame tracking salient points are matched to salient points stored in map information. Thus, real-world coordinates of each salient point can be identified.

If photometric error minimization were utilized for map-to-frame tracking, the map information would store a patch for each salient point identified in the real-world environment. Since there may be thousands, hundreds of thousands, and so on, salient points indicated in the map information, the memory requirements would be great. Advantageously, using descriptors can reduce memory requirements associated with map-to-frame tracking. For example, the map information can store real-world coordinates of each salient point along with a descriptor for the salient point. In some embodiments, since a descriptor can be at least be an order of magnitude less in size than a patch, the map information can be greatly reduced.

As will be described below, the display system can thus leverage both patch-based frame-to-frame tracking and descriptor-based map-to-frame tracking. For example, the display system can track salient points between successive images obtained of a real-world environment. As described above, tracking a salient point can include projecting the salient point from a previous image onto a current image. Through use of patch-based photometric error minimization, the location of the tracked salient point can be determined with great accuracy in the current image. The display system can then identify image areas of the current image that include less than a threshold measure of tracked salient points. For example, the current image can be separated into different image areas, with each image area being ¼, ⅛, 1/16, 1/32, a user-selectable size, and so on, of the current image. As another example, the display system can analyze sparseness of the current image with respect to tracked salient points. In this example, the display system can determine whether any area of the image (e.g., a threshold sized area) includes less than a threshold number of salient points, or less than a threshold density of salient points. Optionally, the image area can be the entire current image, such that the display system can identify whether the entirety of the current image includes less than a threshold measure of tracked salient points. The display system can then extract new salient points from the identified image area(s), and generate a descriptor for each salient point of the current image (e.g., the tracked salient points and the newly extracted salient points). Through matching each generated descriptor to a descriptor of a salient point indicated in the map information, the real-world location of each salient point in the current image can be identified. Thus, the pose of the display system can be determined. Subsequently, the salient points included in the current image can be tracked in a subsequent image, for example as described herein.

Since new salient points may be extracted only in image areas with less than a threshold measure of tracked salient points, the salient point tracking may utilize potentially a large amount of the same tracked salient points between successive image frames. As described above, the tracking can be performed via photometric error minimization ensuring highly accurate localization of salient points between images. In addition, jitter in pose determinations can be reduced as these same tracked salient points will be matched to map information in successive image frames. Furthermore, processing requirements can be reduced as the display system may only be required to extract new salient points in specific image areas. Additionally, since the salient points in a current image are matched to map information, drift in pose determinations can be reduced. Optionally, map-to-frame tracking may not be required for some current images. For example, a user may be looking in a substantially similar real-world area, such that the display system can retain a similar pose. In this example, the current image may not include an image area with less than a threshold measure of tracked salient points. Therefore, frame-to-frame tracking can be solely utilized to determine the display system's pose. Optionally, map-to-frame tracking may be utilized even if no image area includes less than the threshold number of tracked salient points. For example, descriptors can be generated for the tracked salient points, and compared to map information without extracting new salient points. In this way, the display system can perform less processing, thus conserving processing resources and reducing energy consumption.

Reference will now be made to the drawings, in which like reference numerals refer to like parts throughout. Unless specifically indicated otherwise, the drawings are schematic and not necessarily drawn to scale.

Figure 2:
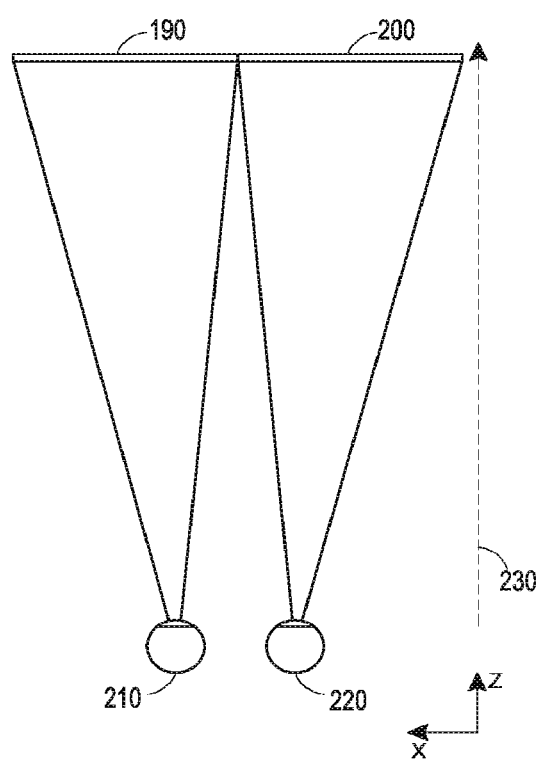
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
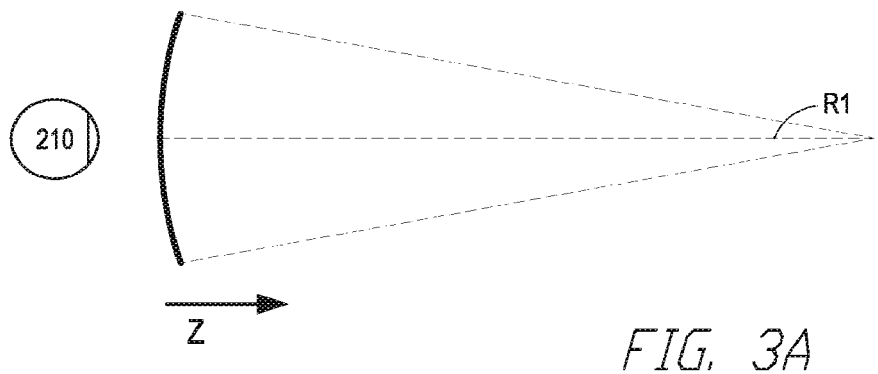
FIGS. 3A-3C illustrate relationships between radius of curvature and focal radius.
Figure 3B:
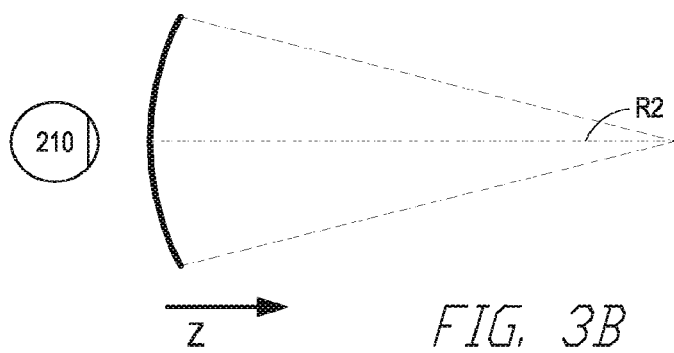
Figure 3C:
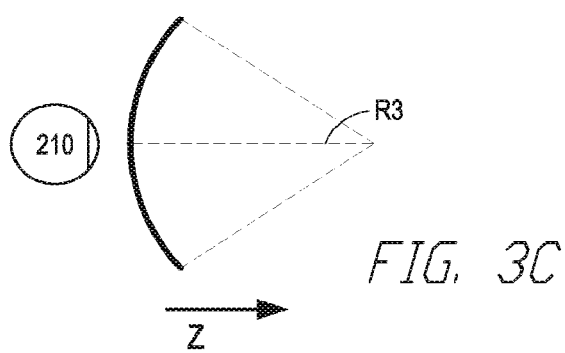

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
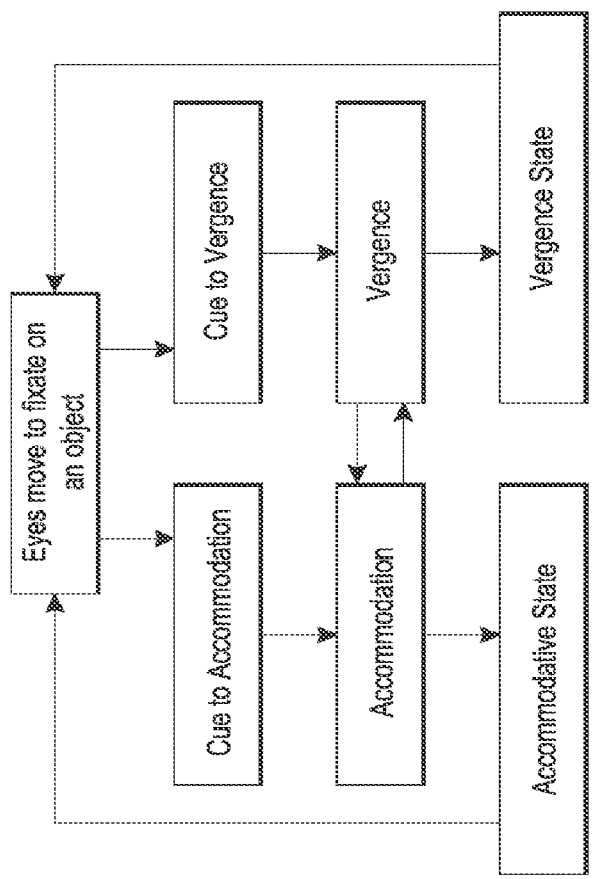
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
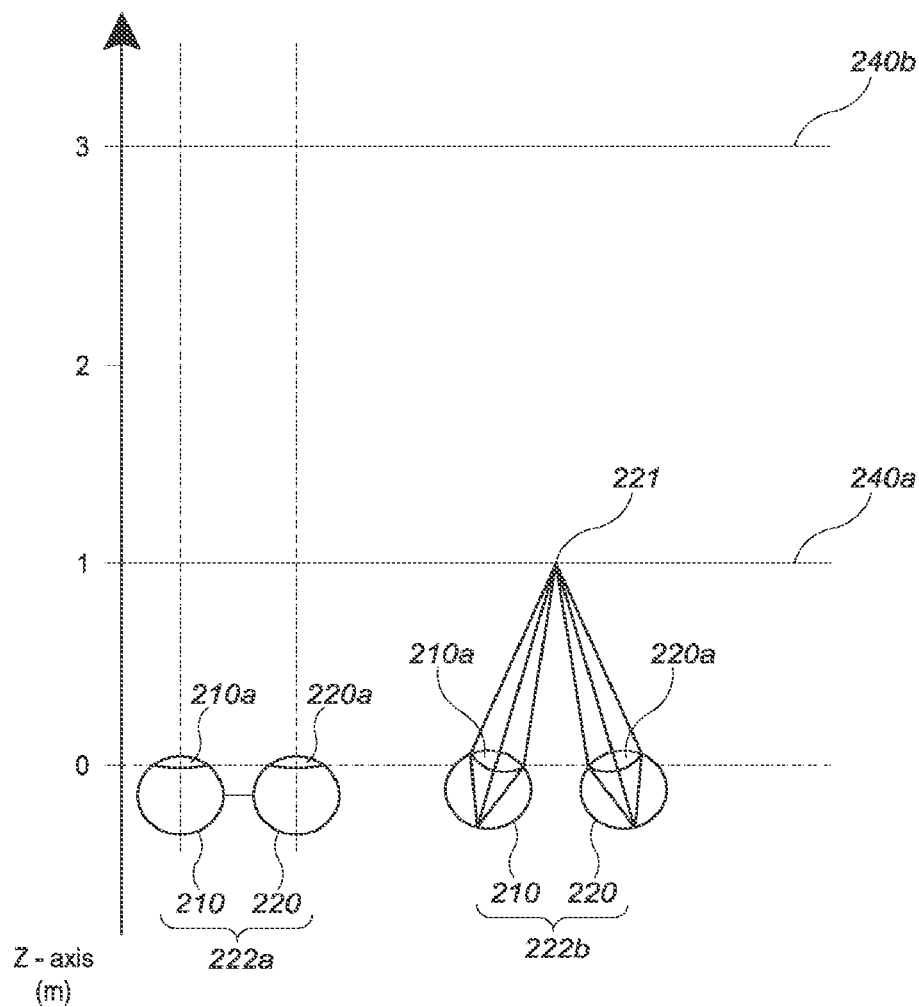
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
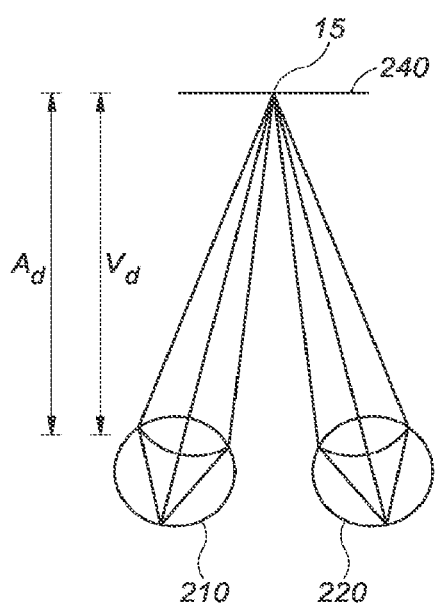
FIG. 4C illustrates an example of a representation of a top-down view of a user viewing content via a display system.
Figure 4D:
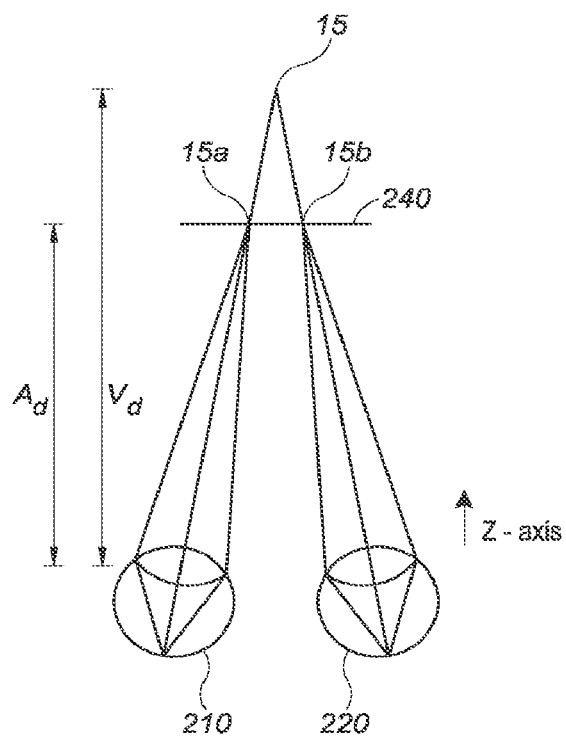
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d - A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
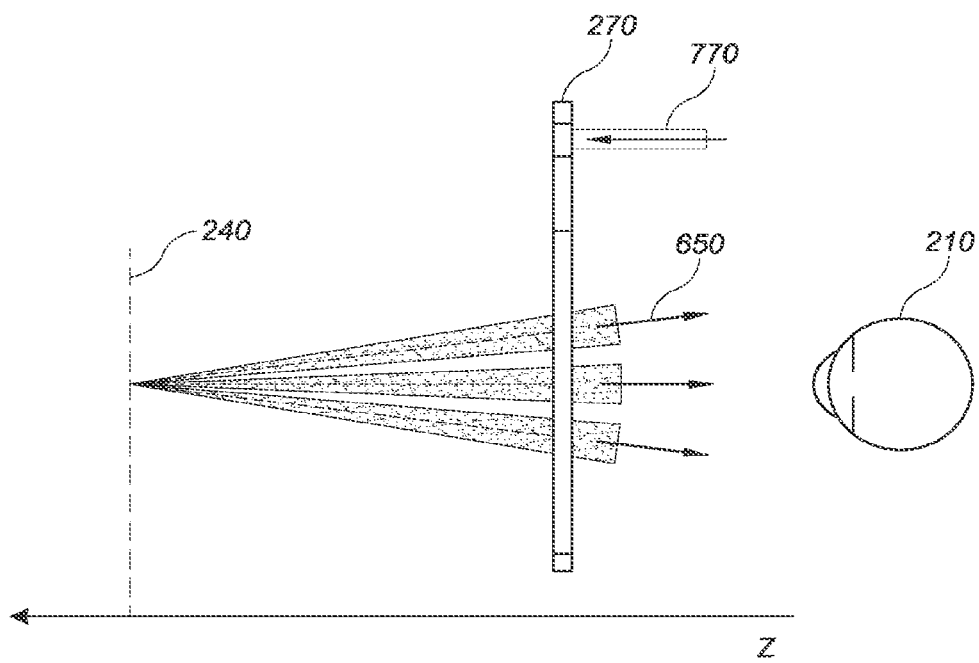
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may follow the contours of a flat or a curved surface. In some embodiments, advantageously for simplicity, the depth planes may follow the contours of flat surfaces.

Figure 6:
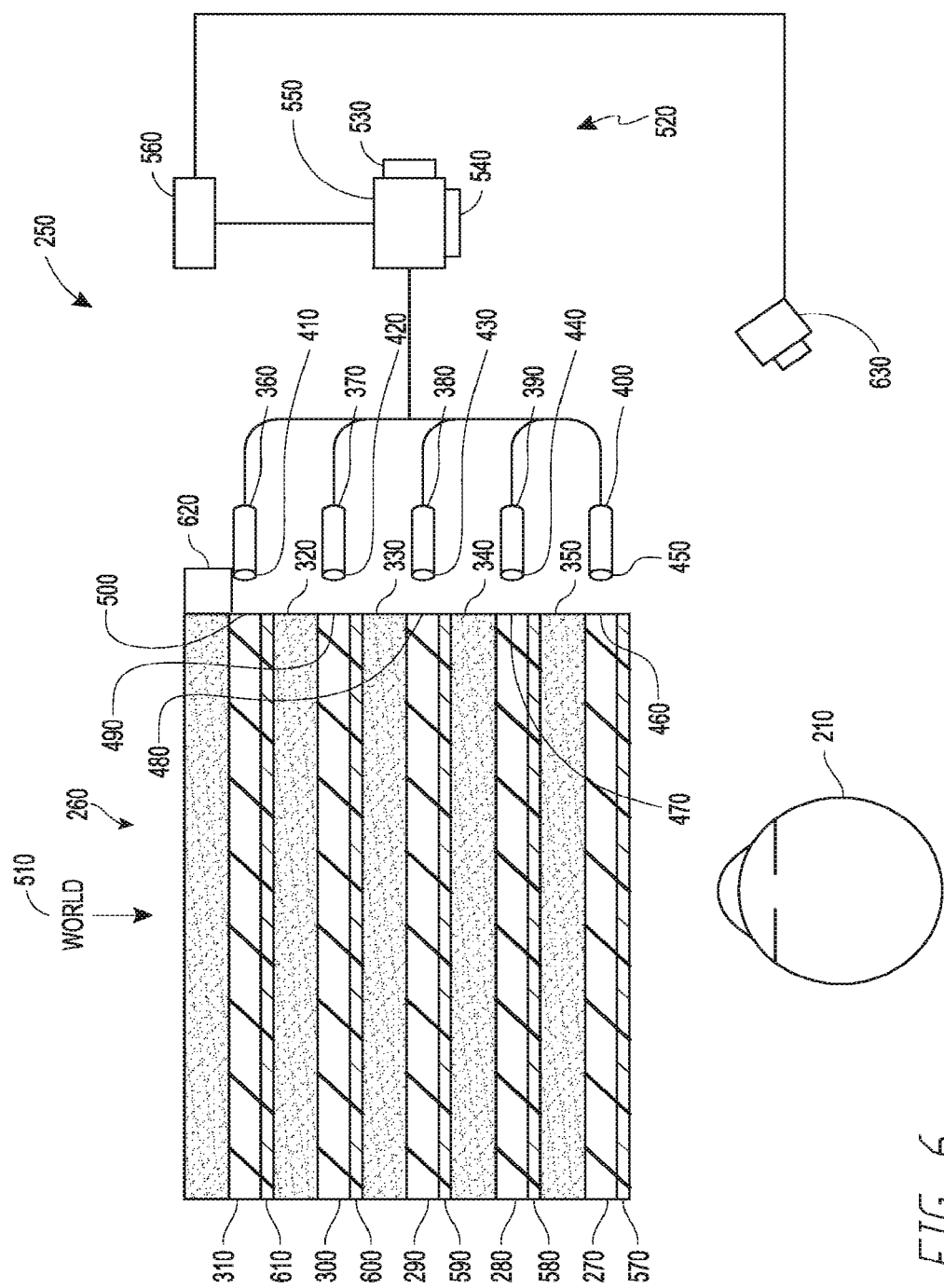
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
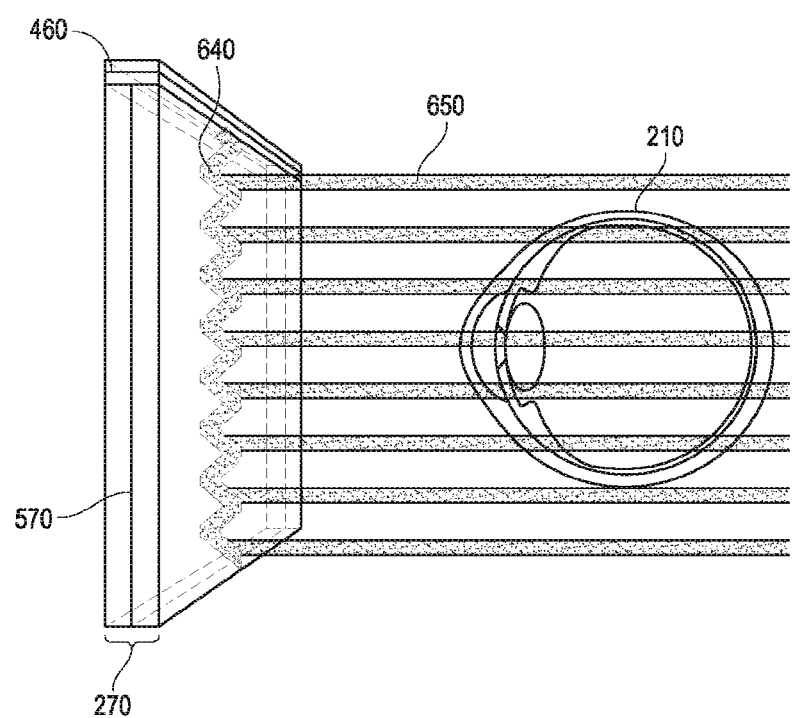
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
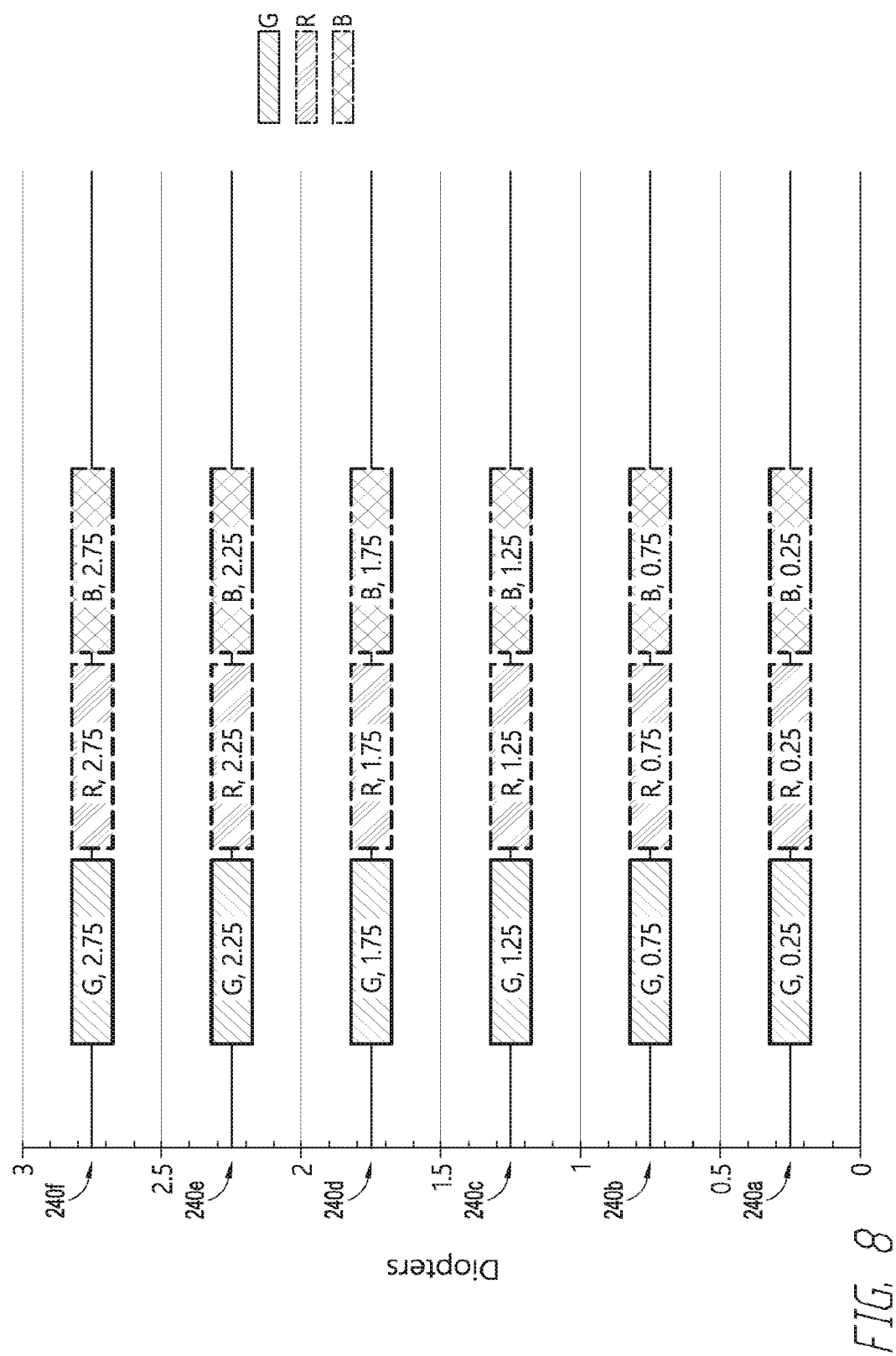
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
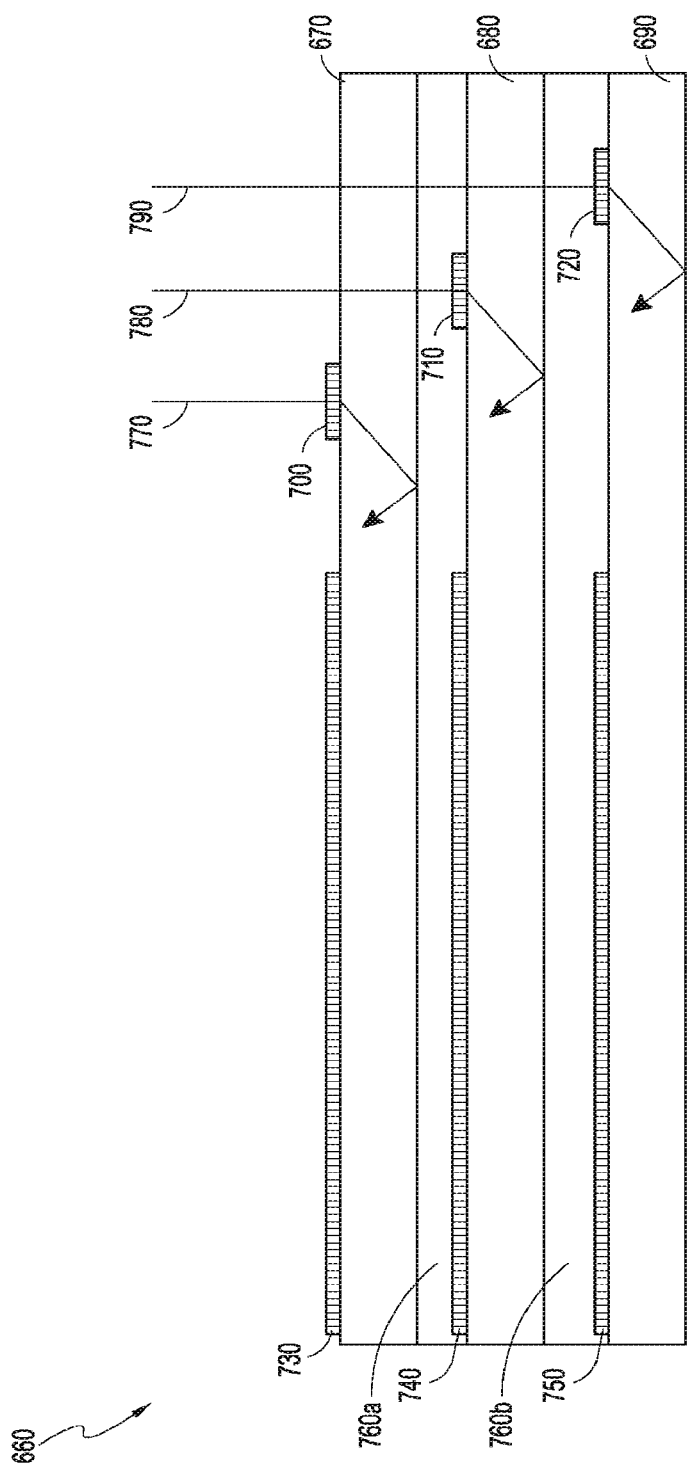
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760*a* may separate waveguides 670 and 680; and layer 760*b* may separate waveguides 680 and 690. In some embodiments, the layers 760*a* and 760*b* are formed of low refractive index materials (that is, materials having a lower refractive index than the material forming the immediately adjacent one of waveguides 670, 680, 690). Preferably, the refractive index of the material forming the layers 760*a*, 760*b* is 0.05 or more, or 0.10 or less than the refractive index of the material forming the waveguides 670, 680, 690. Advantageously, the lower refractive index layers 760*a*, 760*b* may function as cladding layers that facilitate total internal reflection (TIR) of light through the waveguides 670, 680, 690 (e.g., TIR between the top and bottom major surfaces of each waveguide). In some embodiments, the layers 760*a*, 760*b* are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760*a*, 760*b* are similar or the same. In some embodiments, the material forming the waveguides 670, 680, 690 may be different between one or more waveguides, and/or the material forming the layers 760*a*, 760*b* may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
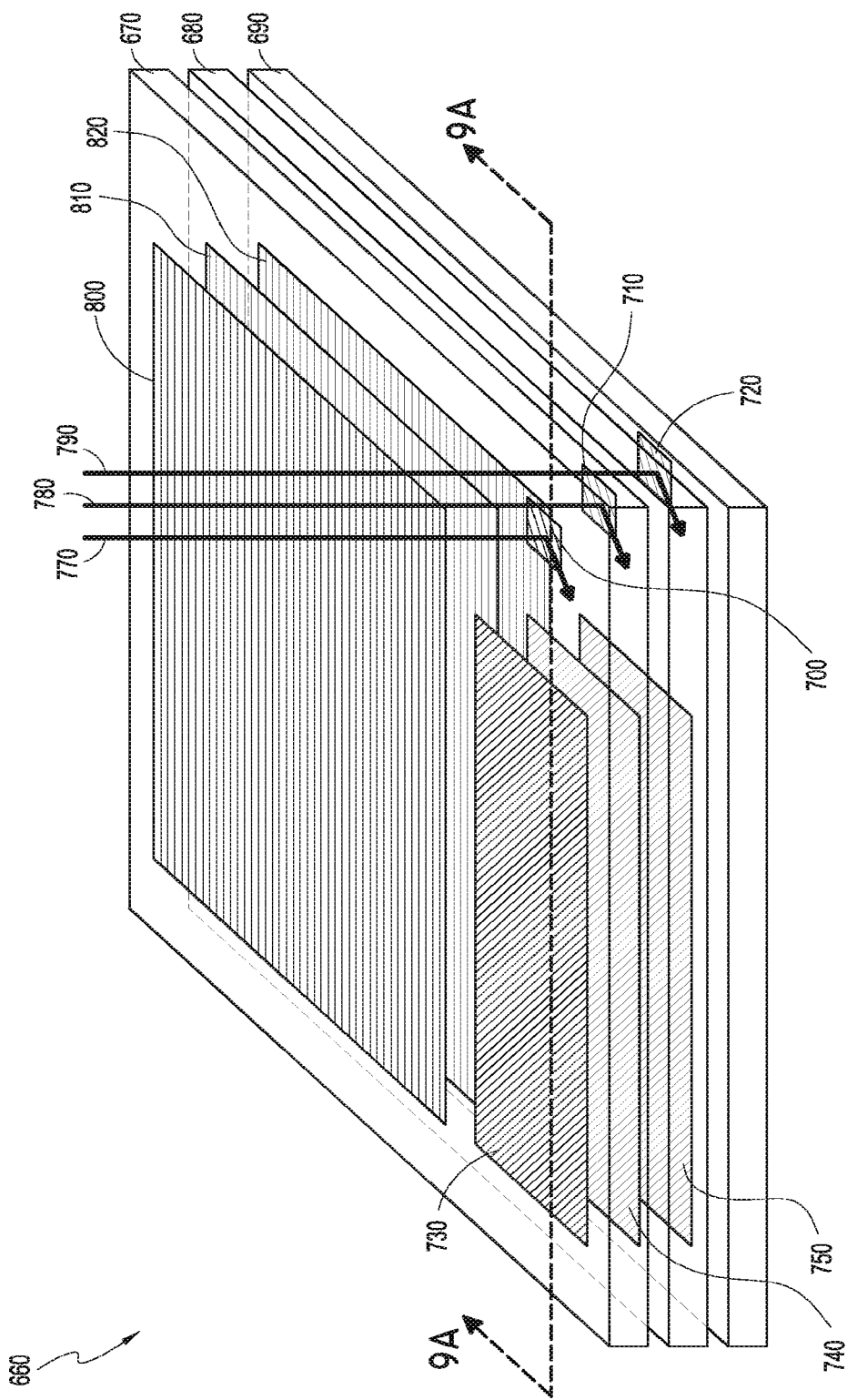
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
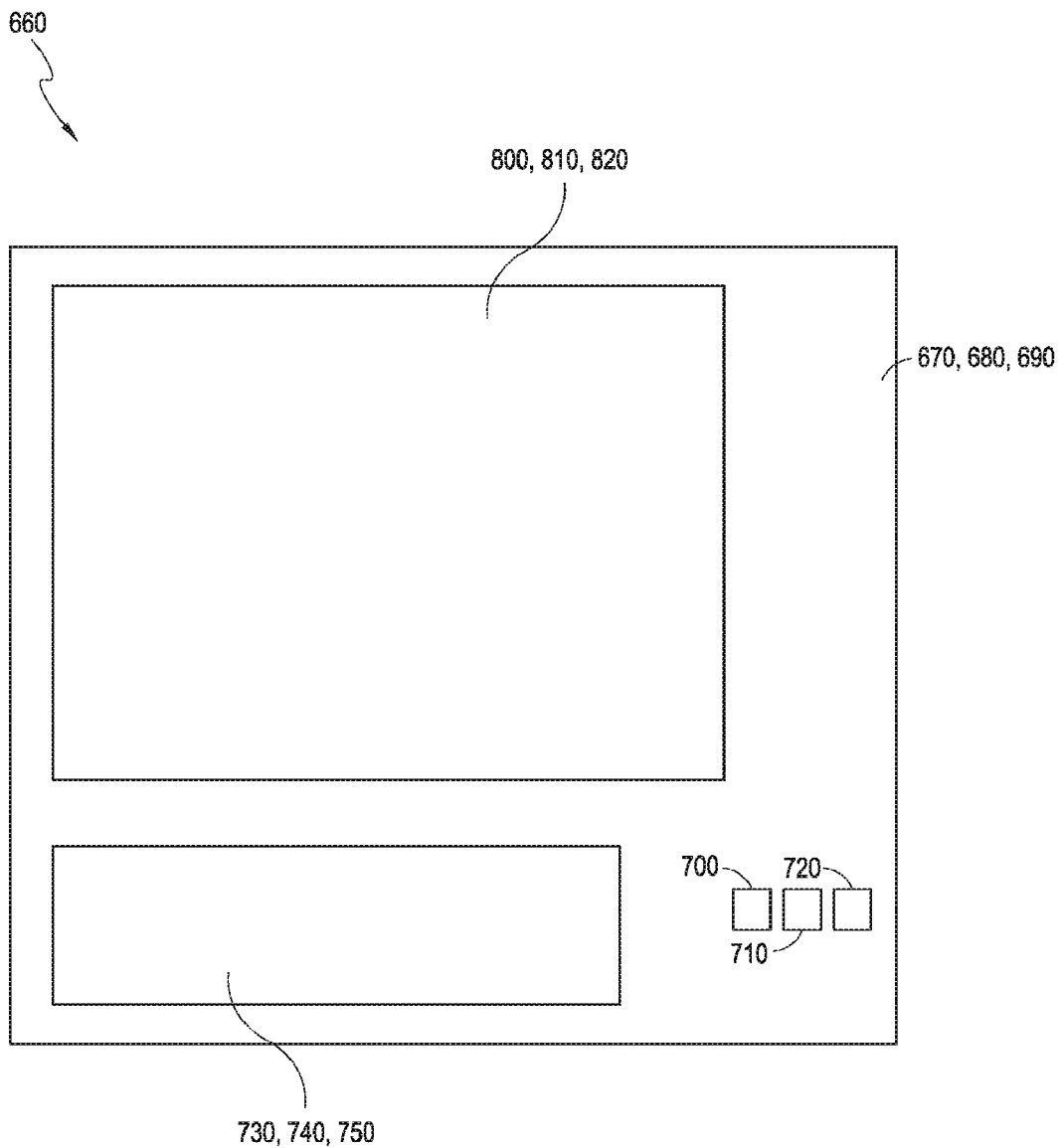
FIG. 9C illustrates a top-down plan view of an example of the plurality of stacked waveguides of FIGS. 9A and 9B.
Figure 9D:
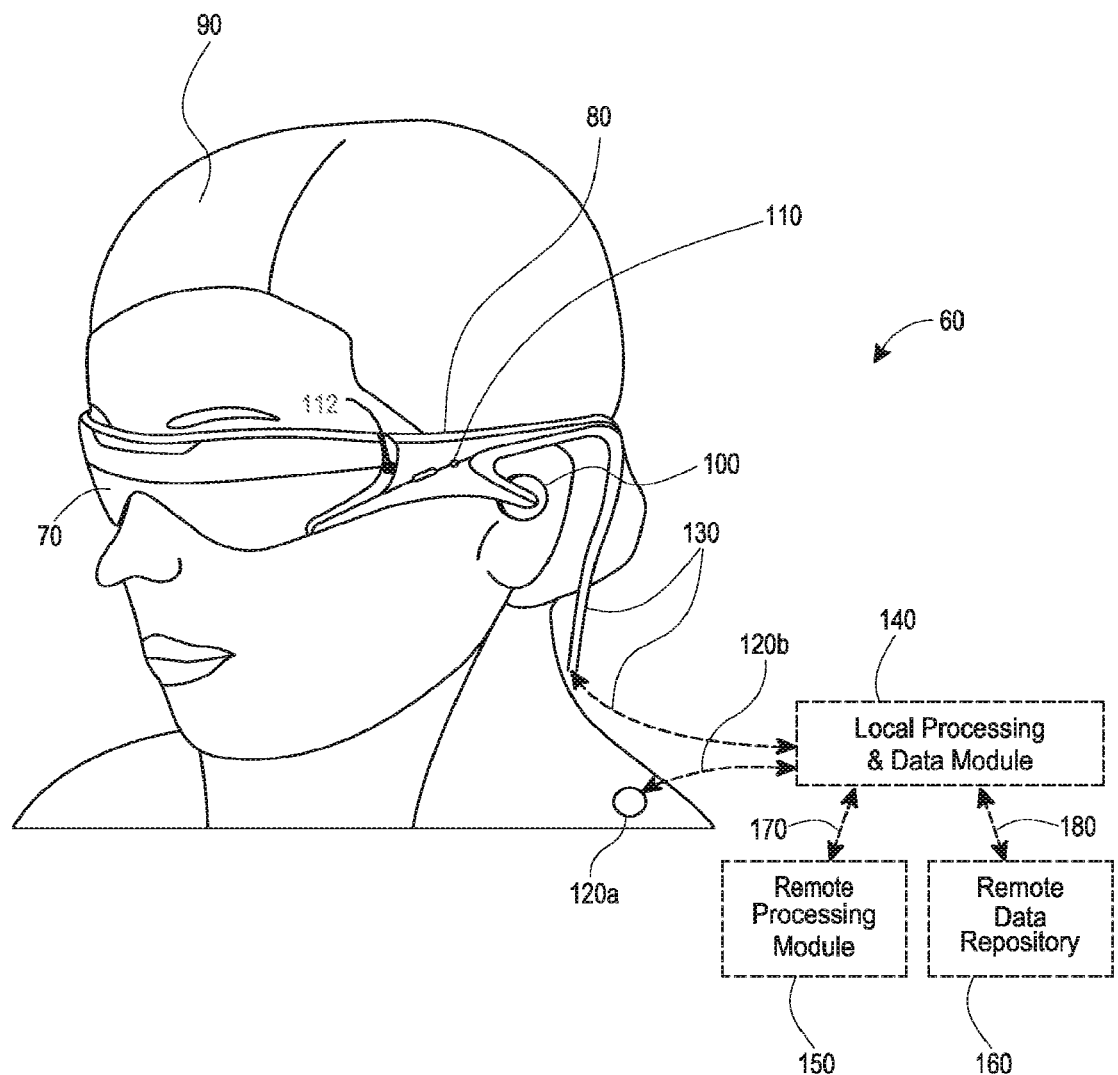
FIG. 9D illustrates an example of wearable display system.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems). The microphone may further be configured as a peripheral sensor to collect audio data (e.g., sounds from the user and/or environment). In some embodiments, the display system 60 may further include one or more outwardly-directed environmental sensors 112 configured to detect objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Pose Determination

As described herein, a display device (e.g., display system 60, described in FIG. 9D) can present virtual content to a user (e.g., a user wearing the display device, such as wearing the display 70 coupled to frame 80). During presentation of the virtual content, the display device can determine poses of the display device and user's head. A pose, as described above, can identify an orientation of the display device and/or user's head, and optionally a position of the display device and/or user's head. For example, the display device can present virtual content comprising a virtual document on a real-world desk. As the user rotates his/her head about the document, or moves closer to or farther from the document, the display device can determine his/her head pose. In this way, the display device can adjust the presented virtual content, such that the virtual document appears as a realistic document on the real-world desk. While the description references virtual content, augmented reality, and so on, the display device may be a virtual reality display system and utilize the techniques described herein.

The display device can utilize imaging devices, such as the environmental sensors 112 described in FIG. 9D above, to determine pose. An imaging device may be, for example, an outward facing camera fixed on the display device. The imaging device can thus obtain images of a real-world environment, and the display device can use these images to determine pose. The imaging device may obtain an image in response to a passing of time (e.g., every $1/10^{th}$, $1/15^{th}$, $1/30^{th}$, $1/60^{th}$, of a second), or in response to detecting that the display device moved a greater amount than a threshold. For example, the imaging device can obtain live images of the real-world environment (e.g., a sensor of the camera may be configured to always be capturing image information). In this example, the display device can determine that the incoming image information has changed greater than a threshold amount, or is changing at greater than a threshold rate. As another example, the display device may include sensors (e.g., magnetometers, gyroscopes, and so on), such as in an inertial measurement unit, and the display device can identify whether the display device has moved greater than a threshold amount using these sensors. In this example, the display device can obtain an image based on information detected by the inertial measurement unit. A current image may therefore be obtained via the imaging device, and can be different from a previous image based on movement of the user. For example, as the user looks around a room the display device can obtain successive images.

As described herein, the display device can track salient points between successive images obtained by the imaging device. In some embodiments, the display device can be configured to perform a patch-based frame-to-frame tracking process. A salient point, as described above, can represent a distinguishable visual point, such as a corner. To track a salient point from a previous image to a current image, the display device can project a patch surrounding the salient point in the previous image onto the current image. As described herein, a patch can be an M×N image area surrounding a salient point. For example, a salient point can correspond to a two-dimensional location in the current image, and the patch can be an M×N image area surrounding the two-dimensional location. The display device can then adjust a location of the projected patch to minimize an error, or aggregate difference in pixel intensities, between the projected patch and a corresponding image area in the current image. Example error minimization processes can include Levenberg-Marquardt, Conjugate Gradient, and so on. A consistent, selected location within the patch, e.g., a centroid of the projected patch, can be understood to be a location of the tracked salient point in the current image. In this way, the display device can identify movement of specific visual points of interest (e.g., salient points, such as corners) from a previous frame to a current frame.

The display device can also be configured to utilize descriptor-based map-to-frame tracking. As described herein, map-to-frame tracking utilizes map information which indicates real-world locations (e.g., three-dimensional locations) of salient points and associated descriptors. For example, the map information can indicate three-dimensional coordinates for a particular corner in a real-world environment. If the particular corner is imaged by the display device, and thus represented in a current image, the display device can match the representation in the current image to its corresponding real-world location. Generating the map information will be described in more detail below, with respect to FIG. 10A. In map-to-frame tracking, new salient points can be extracted from image areas of a current image with less than a threshold measure of tracked salient points (e.g., less than a threshold number or threshold density). Descriptors can be generated for each salient point, and the descriptors matched to descriptors of salient points indicated in the map information. As used herein, a descriptor can describe visual one or more elements associated with a salient point. For example, a descriptor can indicate a shape, color, texture, and so on, of the salient point. Additionally, a descriptor can describe an area surrounding each salient point (e.g., an M×N pixel area surrounding the salient point). A descriptor can represent, for example, a histogram of an area surrounding a salient point (e.g., an alphanumeric value associated with the histogram), a hash of the area (e.g., a cryptographic hash computed from values of each pixel in the M×N pixel area), and so on.

Based on the generated descriptors, the display device can thus match the descriptors generated for each salient point with descriptors of salient points indicated in the map information. In this way, the display device can identify a real-world location (e.g., 3D coordinates) that corresponds to each salient point in the current image. Thus, the salient points in the current image can represent projections of the corresponding 3D real-world coordinates onto a 2D image.

The display device can determine its pose according to these matches. For example, the display device can perform an example pose estimation process, such as perspective-n-point (pnp), efficient pnp, pnp with random sample consensus, and so on. Subsequently, the display device can track the salient points in a subsequent image. For example, the display device can project the salient points in the current image onto the subsequent image, and so on as described above.

Figure 10A:
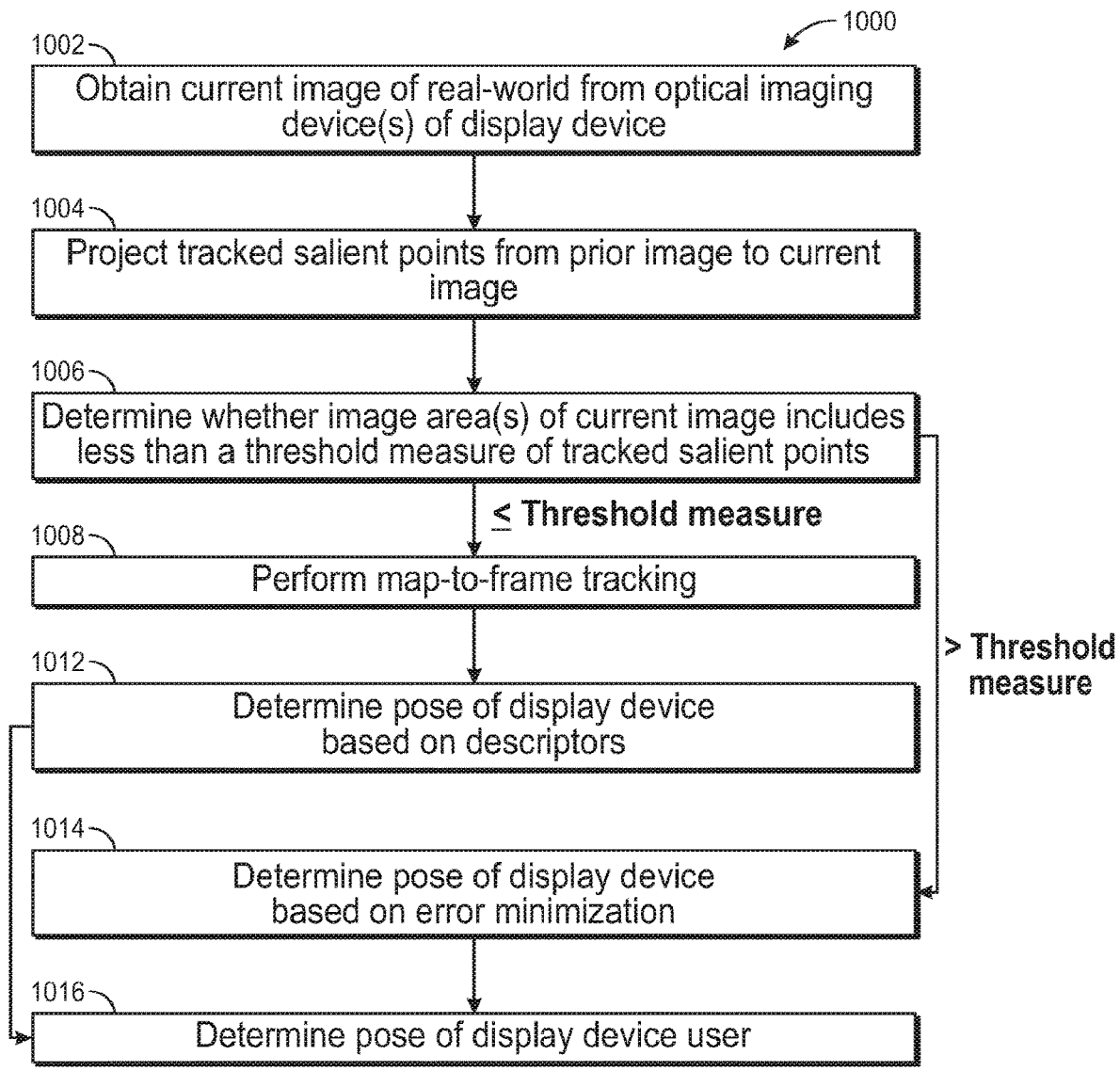
FIG. 10A illustrates a flowchart of an example process for determining a pose of a display system and a pose of a user's head.

FIG. 10A illustrates a flowchart of an example process 1000 for determining a pose of a display system and a pose of a user's head. In some embodiments, the process 1000 may be described as being performed by a display device (e.g., the augmented reality display system 60, which may include processing hardware and software, and optionally may provide information to an outside system of one or more computers for processing, for example to offload processing to the outside system, and receive information from the outside system.) In some embodiments, the display device may be a virtual reality display device comprising one or more processors.

The display device obtains a current image of a real-world environment (block 1002). The display device can obtain the current image from an imaging device, such as an outward-facing camera fixed on the display device. For example, the outward-facing camera can be positioned in a front of the display device to obtain a view similar to a view seen by a user (e.g., a forward-facing view). As described above with respect to FIG. 9D, the display device may be worn by the user. The display device may optionally utilize two or more imaging devices, and obtain images from each at a same time (e.g., a substantially same time). The imaging devices may be configured to thus obtain stereo images of the real-world environment, which can be utilized to determine depth of locations in the images.

The display device can trigger, or otherwise cause, the imaging device to obtain the current image based on a threshold amount of time passing since a previously obtained image. The imaging device can thus obtain images at a particular frequency, such as 10 times a second, 15 times a second, 30 times a second, and so on. Optionally, the particular frequency can be adjusted based on the processing workload of the display device. For example, the particular frequency can be adaptively reduced if the processors of the display device are being utilized at greater than one or more threshold percentages. Additionally or alternatively, the display device may adjust the frequency based on movement of the display device. For example, the display device can obtain information indicating a threshold number of prior determined poses, and determine a variance between the poses. Based on the variance, the display device can increase a frequency at which the display device obtains images, for example until the measure of central tendency is below a particular threshold. In some embodiments, the display device can utilize sensors, such as included in an inertial measurement unit, and increase, or decrease, the frequency according to estimated movements of the user. In some embodiments, in addition to obtaining the current image based on a threshold amount of time passing, the display device can obtain the current image based on estimating that the user moved greater than a threshold amount (e.g., a threshold distance about one or more three-dimensional axes). For example, the display device can utilize the inertial measurement unit to estimate a movement of the user. In some embodiments, the display device can utilize one or more other sensors, such as a sensor detecting light, color variance, and so on, to determine that the information detected by the sensors has changed greater than a threshold in a threshold amount of time (e.g., indicating a movement).

The current image can thus be associated with a current view of the user. The display device can store the current image for processing, for example in volatile or non-volatile memory. Additionally, the display device can have an image stored which was obtained previous to the current image. As will be described, the current image can be compared with the previous image, and salient points tracked from the previous image to the current image. Thus, the display device can store information associated with each salient point in the previous image. For example, the information can include a patch for each salient point and optionally a location in the previous image in which the patch appeared (e.g., pixel coordinates of the salient point). In some embodiments, instead of storing the full previous image, the display device can store the patches for each salient point included in the previous image.

As described above, a patch can represent an M×N sized image area surrounding a salient point (e.g., a salient point as imaged). For example, a salient point can be a centroid of the patch. Since the salient point may be a visual point of interest, such as a corner, the corner may be larger than a single pixel in some embodiments. The patch can therefore surround a location of the visual point of interest, for example, at which two lines intersect (e.g., on a keyboard '7', the patch can surround the intersection of the horizontal line with the slanted vertical line). For example, the display device can select a particular pixel as being the salient point, and the patch can surround this particular pixel. Additionally, two or more pixels may be selected, and the patch can surround these two or more pixels. As will be described below, the patches of the previous image can be utilized to track associated salient points in the current image.

The display device projects tracked salient points from the previous image to the current image (block 1004). As described above, the display device can store information associated with salient points included in the previous image. Example information can include a patch surrounding a salient point, along with information identifying the patch's location in the previous image. The display device can project each salient point from the previous image onto the current image. As an example, a pose associated with the previous image can be utilized to project each salient point onto the current image. As will be described below, a pose estimate, such as an optical flow, can be determined by the display device. This pose estimate can adjust the pose determined for the previous image, and thus an initial projection of the tracked salient points on the current image can be obtained. As will be described, this initial projection can be refined.

The display device can determine a pose estimate, which is sometimes referred to as a prior, based on a trajectory prediction (e.g., based on prior determined poses) and/or based on an inertial measurement unit, an extended kalman filter, visual inertial odometry, and so on. With respect to the trajectory prediction, the display device can determine a likely direction that the user is moving. For example, if a previous threshold number of pose determinations indicate that the user is rotating his/her head downwards in a particular way, the trajectory prediction can extend this rotation. With respect to the inertial measurement unit, the display device can obtain information indicating an adjustment to orientation and/or position as measured by sensors of the inertial measurement unit. The pose estimate can therefore enable determination of an initial estimated location corresponding to each tracked salient point in the current image. In addition to the pose estimate, the display device can utilize real-world locations of each salient point as indicated in map information to project the salient points. For example, the pose estimate can inform an estimated movement of each salient point from a 2D location in the previous image to a 2D location in the current image. This new 2D location can be compared to the map information, and an estimated location of the salient point can be determined.

The patch for each salient point in the previous image can be compared to a same size M×N pixel area of the current image. For example, the display device can adjust a location of a patch projected on the current image, until a photometric error between the patch and a same size M×N pixel area of the current image on which the patch is projected is minimized (e.g., substantially minimized, such as a local or global minimum, or an error below a user-selectable threshold). In some embodiments, a centroid of the M×N pixel area of the current image can be indicated as corresponding to a tracked salient point. Projecting tracked salient points is described in more detail below, with respect to FIGS. 11-12B.

Optionally to determine the pose estimate, the display device can minimize a combined photometric cost function of all projected patches by varying a pose of the current image. For example, the display device can project the patches associated with each salient point in the previous image onto the current image (e.g., based on an initial pose estimate as described above). The display device can then globally adjust the patches, for example via modifying this initial pose estimate, until a photometric cost function is minimized. In this way, a more accurate refined pose estimate may be obtained. As will be described below, this refined pose estimate can be used as a prior, or regularization, when determining pose of the display device. For example, the refined pose estimate can be associated with a cost function, such that deviations from the refined pose estimate have an associated cost.

Thus, the current image can include salient points that were tracked from a previous image. As will be described below, the display device can identify image areas of the current image with less than a threshold measure of tracked salient points. This can represent, for example, a user moving his/her head to a new location of a real-world environment. In this way, new image areas of a current image which image the new location may not include salient points tracked from previous images.

The display device determines whether an image area of the current image includes less than a threshold measure of tracked salient points (block 1006). As described above, the display device can determine its pose according to patch-based frame-to-frame tracking, for example via projection of tracked salient points onto successive images, and optionally in combination with map-to-frame tracking. Map-to-frame tracking can be utilized if one or more image areas of the current image include less than a threshold measure of tracked salient points, for example a threshold number of salient points or a threshold density of salient points in the image area.

Figure 10B:
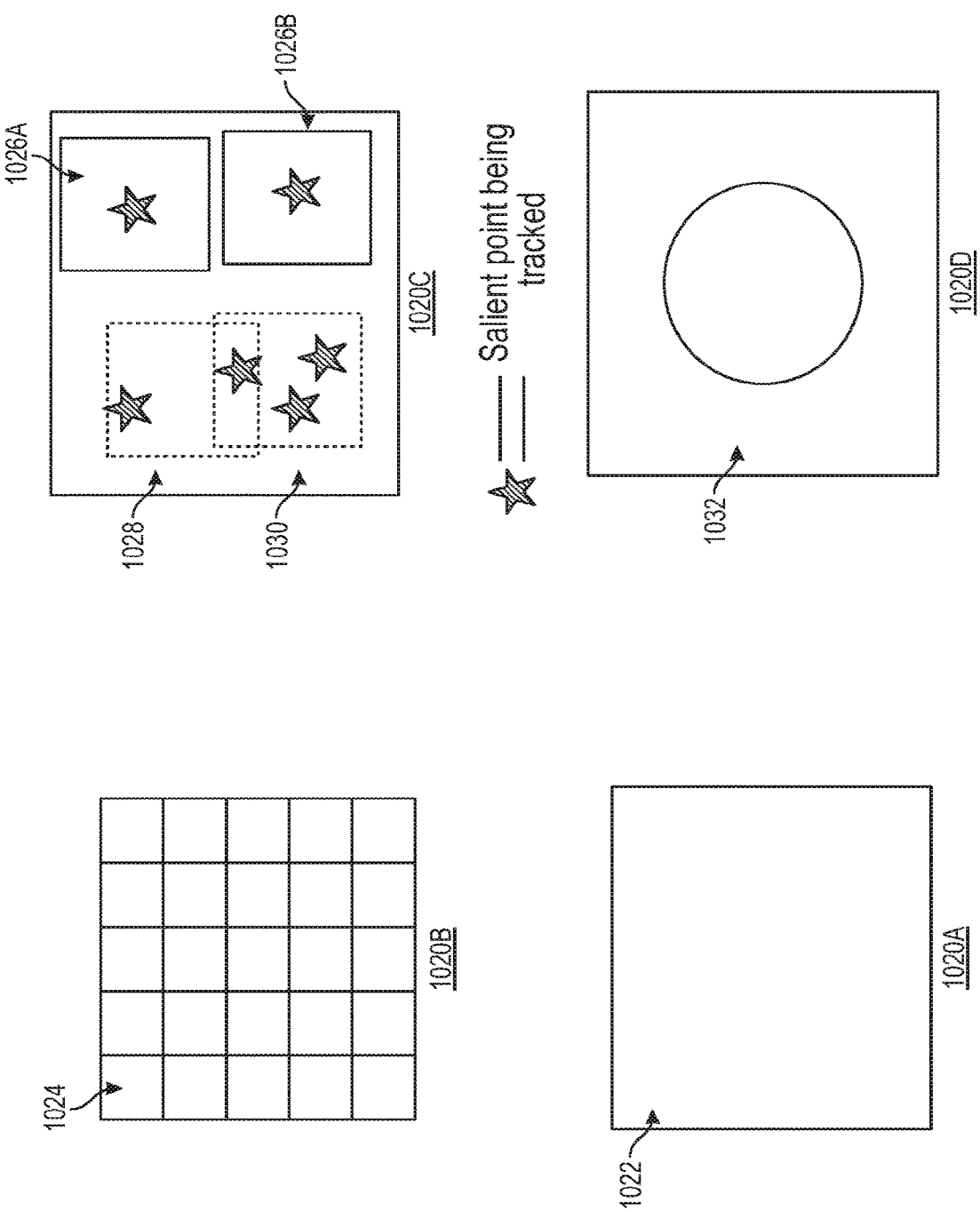
FIG. 10B illustrates example image areas of a current image.

FIG. 10B illustrates example image areas of example current images. In the example of FIG. 10B, current images 1020A, 1020B, 1020C, and 1020D, are illustrated. These current images may be obtained via a display device, for example as described above with respect to block 1002. Current image 1020A is illustrated with example image area 1022. As described above, an image area may encompass an entirety of a current image. Thus, the display device can determine whether the current image 1020A as a whole includes less than a threshold measure of tracked salient points.

In some other embodiments, the current image may be subdivided into distinct portions. For example, the current image 1020B in the example of FIG. 10B is separated into a 5×5 grid, each area of the grid forming a distinct portion. Example image area 1024 is therefore one of these portions. The display device can determine whether any of these portions includes less than the threshold measure of tracked salient points. In this way, as new locations of a real-world environment are included in the current image 1020B, one or more of the portions may include less than the threshold measure of tracked salient points. The size of the grid may be adjustable by a user and/or by the display system. For example, the grid may be selected to be 3×3, 7×7, 2×4, and so on. Optionally, the grid may be adjusted during operation of the display system, e.g., with of the sizes of the various portions of the image varying as the user utilizes the display system (e.g., in substantially real-time, according to processing constraints, accuracy thresholds, differences in pose estimations between images, and so on).

Current image 1020C is illustrated with example tracked salient points. In this example, an image area may be determined according to a sparseness of the tracked salient points. For example, image area 1026A and 1026B are illustrated as surrounding a single tracked salient point. A size of the image area may be user-selectable, or a fixed system-determined size (e.g., an M×N pixel area). The display device can analyze the tracked salient points, and determine whether an image area with less than the threshold measure can be located in the current image 1020C. For example, image areas 1026A and 1026B have been identified by the display device as including less than the threshold measure. Optionally, the display device can identify image areas which include greater than the threshold measure, and identify the remaining image areas as including less than the threshold measure. For example, image areas 1028 and 1030 have been identified as including greater than the threshold measure of tracked salient points. Thus, in this example the display device can identify anywhere outside of the images 1028 and 1030 as having less than the threshold measure of tracked salient points. The display device can then extract new salient points in these outside image areas. Optionally, the display device can determine a clustering measure for locations in the current image. For example, a clustering measure can indicate an average distance that a location is from tracked salient points. Additionally, a clustering measure can indicate an average number of tracked salient points that are within a threshold distance of the location. If the clustering measure(s) are below one or more thresholds, the display device can extract new salient points at these locations. Optionally, the display device can extract new salient points in an M×N area surrounding each location.

Current image 1020D is illustrated with example image area 1032. In this example, the image area 1032 can be placed in a particular location of the current image 1020D, such as the center of the current image 1020D. In some embodiments, the example image area 1032 can represent a particular field of view of the user. The image area 1032 may be a particular shape or polygon, such as a circle, oval, rectangle, and so on. In some embodiments, the image area 1032 can be based on an accuracy associated with a lens of an imaging device. For example, the image area 1032 can represent a center of the lens that is substantially free of distortion introduced at the edges of the lens. Thus, the display device can identify whether the image area 1032 includes less than the threshold measure of tracked salient points.

With reference again to FIG. 10A, the display device performs map-to-frame tracking (block 1008). The display device can identify whether any image area of the current image includes less than the threshold measure of tracked salient points. As described above, the display device can extract new salient points in the identified image areas. For example, the display device can identify 2D locations of new salient points in the image areas. The display device can then receive descriptors for the newly extracted salient points, and the existing, tracked, salient points. For example, the display device can provide descriptors for the newly extracted, and tracked, salient points by, e.g., generating these descriptors. Optionally, the display device can provide descriptors by generating descriptors for the newly extracted salient points, and by receiving (e.g., obtain from memory) descriptors for the tracked salient points. As an example, the display device can utilize descriptors for tracked salient points which were previously generated. For example, the descriptors may have been generated when each tracked salient point was newly extracted from an image. These descriptors can be matched, by the display device, with descriptors stored in map information. Since the map information stores real-world coordinates of salient points, the display device can identify the real-world coordinates of each salient point tracked in the current image. Performing map-to-frame tracking will be described in more detail below, with respect to FIG. 13.

Map information, as utilized herein, can be generated by the display device. For example, the display device can utilize stereo imaging devices, depth sensors, lidar, and so on, to determine depth information associated with locations in a real-world environment. The display device can update the map information periodically, for example every threshold number of seconds or minutes. Additionally, the map information can be updated based on identifying that current images, for example as obtained from stereo imaging devices, are key-frames. This can be identified according to time, as described above, and optionally according to differences between the current images and a previous (e.g., most recent) key-frame. For example, if the current images have changed more than a threshold, the current images can be identified as a key-frame. These key-frames can then be analyzed to update the map information.

With respect to stereo imaging devices, the display device can generate descriptors for salient points in each stereo image. Using known extrinsic calibration information, for example, relative pose between the two imaging devices, depth information can be identified. Based on descriptor matching of salient points between the stereo images, and the depth information, real-world coordinates (e.g., with respect to a coordinate reference frame) can be determined for each salient point. One or more of the generated descriptors for each matched salient point can then be stored. Thus, during map-to-frame tracking, these stored descriptors for real-world salient points can be matched to descriptors of salient points included in captured images (e.g., current images). As an example, one of the stereo imaging devices may obtain a current image (e.g., as described in block 1002). The display device can access the map information, and match descriptors, in some embodiments generated for this same imaging device, with descriptors of salient points included in the current image. Optionally, patch-based photometric error minimization may be utilized to match salient points between the stereo images, and thus determine real-world coordinates to be stored in the map information. The display device can then generate respective descriptors for the salient points (e.g., from one or more of the stereo images), and these descriptors can be utilized to perform map-to-frame tracking. Further description of generating map information is included in, at least, FIG. 16 and the related description of U.S. Patent Pub. 2014/0306866, which is incorporated by reference herein in its entirety.

With continued reference to FIG. 10A, the display device determines a pose based on the descriptor matching (block 1012). As described above, the display device can identify real-world coordinates (e.g., three-dimensional coordinates, for example with respect to a particular coordinate reference frame) for each salient point included in the current image. The display device can then determine its pose utilizing, for example, a perspective-n-point algorithm. Information associated with an imaging device, such as intrinsic camera parameters, can be utilized to determine a pose. Thus, the pose determined by the display device can represent a camera pose. The display device can adjust this camera pose to determine a pose of the user (e.g., block 1016), a pose associated with a front (e.g., middle) of the display device, and so on. For example, the display device can linearly transform the camera pose according to a known translational or rotational offset of the camera from the user.

In some embodiments, the display device can utilize information obtained from an IMU to determine pose. For example, the information can be utilized as a prior, or regularization, to determine pose. The display device can thus use the inertial measurement unit information as a cost function associated with the determination. As an example, a divergence from the inertial measurement unit information can be associated with a cost. In this way, the inertial measurement information can be taken into account and can improve accuracy of the resulting pose determination. Similarly, the display device may utilize information associated with an extended kalman filter and/or visual-inertial odometry.

Similarly, the display device can utilize information obtained during frame-to-frame tracking as a similar prior, or regularization. As described above, the display device can minimize a combined photometric cost function of all patches by varying a pose of the current image. In this way, a refined pose estimate may be identified. This refined pose estimate can be utilized as a prior optionally in combination with the IMU, extended kalman filter, and/or visual-inertial odometry.

Subsequent to determining pose, the display device can generate a patch for each of the salient points included in the current image. For example, the display device can generate a patch for a salient point newly extracted from the current image, and also a patch for a salient point tracked from the previous image. Generating a patch can include obtaining an M×N pixel area surrounding each salient point in the current image. Optionally, for a salient point tracked from the previous image, the display device can utilize the patch associated with the previous image. That is, when tracking the salient point into a subsequent image, the patch from the previous image (e.g., not the current image) can be utilized in frame-to-frame tracking. The display device can then obtain a subsequent image and blocks 1002-1016 can be repeated for this subsequent image.

With continued reference to FIG. 10A, the display device determines a pose from the tracked salient points (block 1014). If no image area of the current image includes less than the threshold measure of tracked salient points, the display device can optionally determine its pose based on the tracked salient points. For example, the display device can determine its pose utilizing, for example, a perspective-n-point algorithm. Optionally, the display device can utilize IMU, extended kalman filter, visual-inertial odometry information, as a prior or regularization. Optionally, the display device can perform block 1012 if no image areas included less than the threshold measure of tracked salient points, and not perform block 1014.

The display device determines a pose of the display device user (block 1016). The pose of the display device can represent a camera pose, for example a pose associated with an imaging device. The display device can adjust this pose based on a known offset of the user from the camera. Optionally, the display device can perform initial training when the user wears the display device to, e.g., determine an appropriate offset. This training can inform the user's perspective with respect to the imaging device, and can be utilized to determine a pose of the display device user. Some examples of methods for performing the initial training may be found in U.S. application Ser. No. 15/717,747, filed on Sep. 27, 2017, which is hereby incorporated by reference in its entirety.

Figure 11:
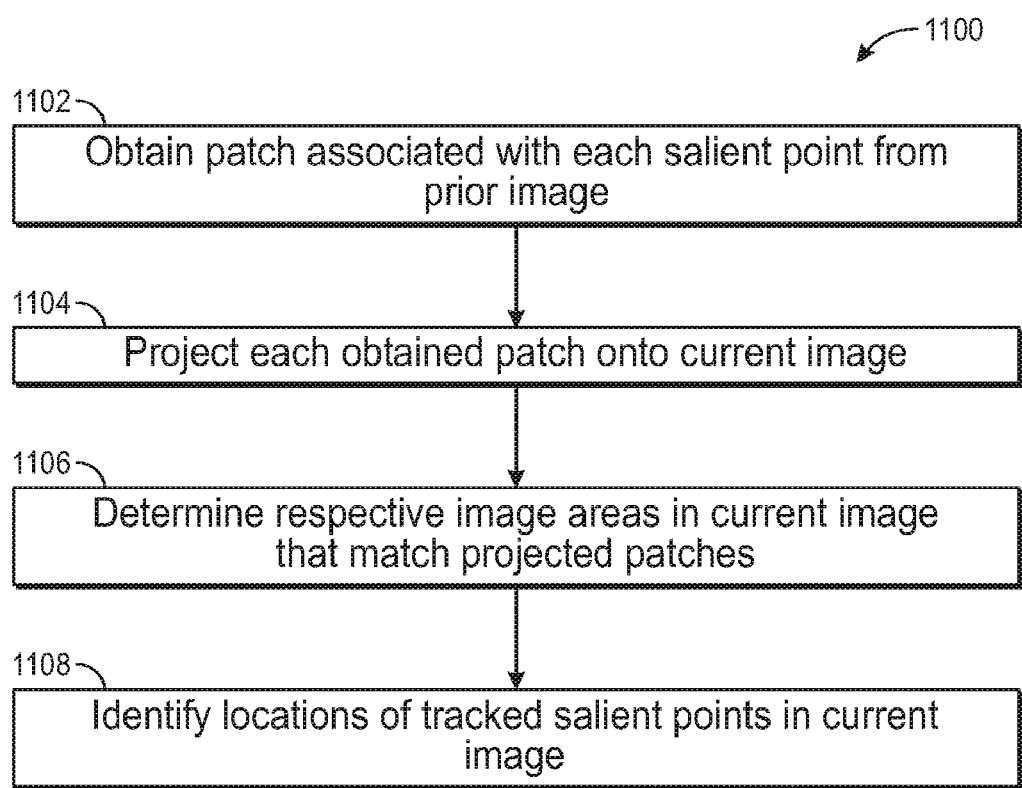
FIG. 11 illustrates a flowchart of an example process for frame-to-frame tracking.

FIG. 11 illustrates a flowchart of an example process 1100 for frame-to-frame tracking. In some embodiments, the process 1100 may be described as being performed by a display device (e.g., the display system 60, which may include processing hardware and software, and optionally may provide information to an outside system of one or more computers for process, for example to offload processing to the outside system, and receive information from the outside system). In some embodiments, the display device may be a virtual reality display device comprising one or more processors.

The display device obtains a patch associated with each salient point from a previous image (block 1102). As described above, with respect to FIG. 10A, the display device can store patches for each salient point being tracked. Thus, when a current image is obtained, the display device can obtain patch information (e.g., from stored memory) associated with salient points included in a previous image.

The display device projects each obtained patch onto the current image (block 1104). Reference will now be made to FIG. 12A. FIG. 12A illustrates examples of a previous image (e.g., Image A 1202) and a current image (e.g., Image B 1204). Each image is illustrated as including salient points being tracked.

As described above, with respect to FIG. 10A, the display device can determine a pose estimate associated with the current Image B 1204. Additionally, each salient point included in previous Image A 1202 has known real-world locations or coordinates (e.g., based on map-to-frame tracking previously performed for this image). Thus, based on these real-world locations, a pose of the previous Image A 1202, and the pose estimate, projections of the salient points onto Image B 1204 can be determined. For example, the pose of the previous Image A 1202 can be adjusted according to the pose estimate, and based on the real-world locations of the salient points in Image A 1202, the salient points can be projected onto Image B 1204 at 2D locations of the image 1204. As illustrated, tracked salient point 1208 is associated with a real-world location 1206. Based on this real-world location 1206, the display device has determined that the salient point 1208 is located in Image B 1204 at an initial estimated 2D location. As described above, optionally the pose estimate can be refined via information from an inertial measurement unit, extended kalman filter, visual-inertial odometry, and so on.

Figure 12B:
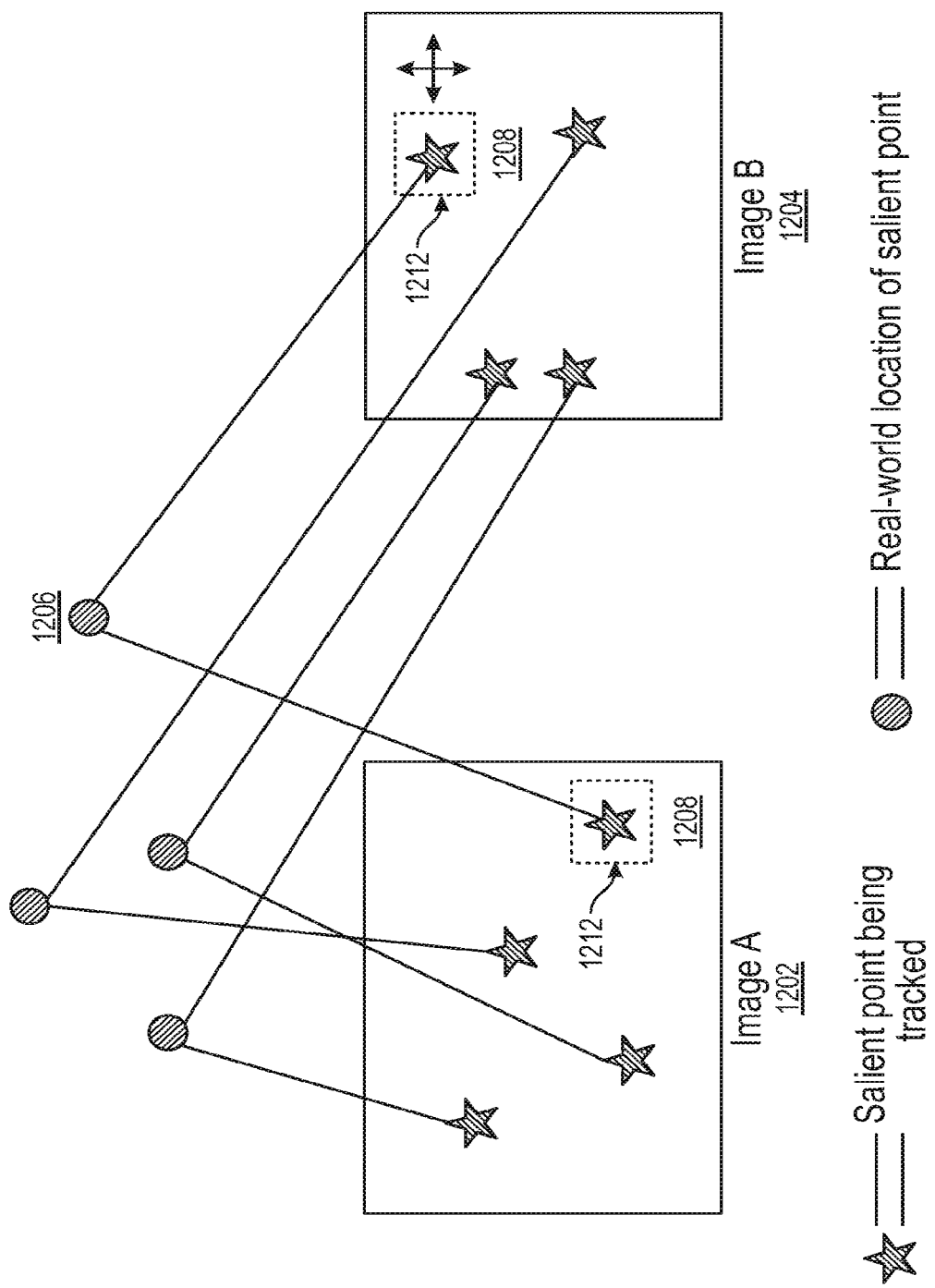
FIG. 12B illustrates an example of a patch projected onto the current image of FIG. 12A.

FIG. 12B illustrates a patch 1212 associated with salient point 1208 being projected onto Image B 1204. As will be described below, the projected patch 1212 can be adjusted in location on Image B 1204. The adjustment can be based on reducing an error associated with the projected patch 1212 and the corresponding image area of Image B 1204. The error can be, for example, a difference in pixel values (e.g. intensity values) between pixels of the projected patch 1212 and pixels in the corresponding image area of Image B 1204, with the position of the patch 1208 adjusted to minimize the difference in values.

With reference again to FIGS. 11 and 12A, the display device determines an image area in the current image that matches a projected patch (block 1106). As illustrated in FIG. 12B, patch 1212 has been projected onto Image B 1204. The projection can represent, for example, an initial estimated location. The display device can then adjust a location of the projected patch 1212 on Image B 1204 to refine the estimate. For example, the location of projected patch 1212 can be moved horizontally or vertically by one or more pixels from the initial estimated location. For each adjusted location, the display device can determine a difference between the projected patch 1212 and a same M×N image area of Image B 1204 on which the patch 1212 is located. For example, a difference in respective pixel values (e.g. intensity values) can be computed. The display device can adjust the patch 1212 based on photometric error optimization. For example, Levenberg-Marquardt, Conjugate Gradient, and so on, may be utilized to arrive at a local error minimum, global error minimum, error below a threshold, and so on.

The display device identifies tracked salient points in the current image (block 1108). For example, tracked salient point 1208 can be identified as having a 2D location corresponding to a centroid of the adjusted patch 1212 on Image B 1204. Thus, as illustrated, salient point 1208 has been tracked from Image A 1202 to Image B 1204.

Figure 13:
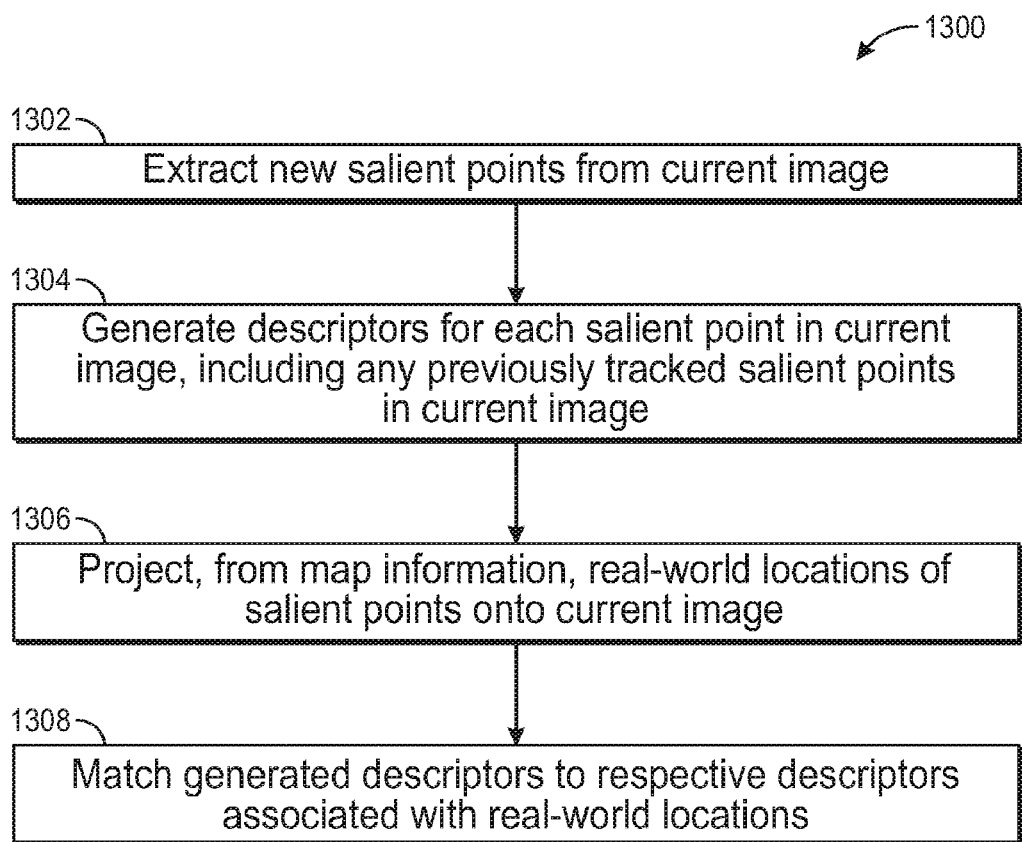
FIG. 13 illustrates a flowchart of an example process for map-to-frame tracking.

FIG. 13 illustrates a flowchart of an example process 1300 for map-to-frame tracking. In some embodiments, the process 1300 may be described as being performed by a display device (e.g., the augmented reality display system 60, which may include processing hardware and software, and optionally may provide information to an outside system of one or more computers for process, for example to offload processing to the outside system, and receive information from the outside system). In some embodiments, the display device may be a virtual reality display device comprising one or more processors.

The display device extracts new salient points from a current image (block 1302). As described above, with respect to FIG. 10A, the display device can identify image areas of a current image that have less than a threshold measure of tracked salient points. Example image areas are illustrated in FIG. 10B. For these identified image areas, the display device can extract new salient points (e.g., identify locations of the current image that illustrate salient points). For example, with respect to the salient points being corners, the display device can perform Harris corner detection, features from accelerated segment test (FAST) corner detection, and so on, on the identified image areas.

The display device generates descriptors for each salient point (block 1304). The display device can generate a descriptor for the (1) tracked salient points (e.g., salient points tracked from a previous image), and the (2) newly extracted salient points. As described above, a descriptor can be generated that describes visual points of interest of the salient point (e.g., as imaged in a current image), or an M×N image area surrounding the salient point. For example, the descriptor can indicate shape, color, texture, and so on, that is associated with the salient point. As another example, the descriptor can indicate histogram information associated with the salient point.

The display device projects real-world locations of the salient points onto the current image (block 1306). Reference will now be made to FIG. 14A. FIG. 14A illustrates current Image B 1204 with newly extracted salient points (e.g., salient point 1402). For example, the display device has determined that a lower portion of Image B 1204 included less than a threshold measure of tracked salient points, and has extracted salient points from this lower portion. Thus in the example of FIG. 14A, Image B 1204 includes 7 salient points–4 tracked salient points and 3 newly extracted salient points The display device identifies real-world locations that correspond to the salient points included in Image B 1204. This identification can be an initial estimate of a real-world location for the salient points included in Image B 1204. As will be described, this estimate can be refined based on descriptor matching, such that each real-world location of a salient point in Image B 1204 can be accurately determined.

With respect to the tracked salient point 1208, the display device can identify that tracked salient point 1208 is likely within a threshold real-world distance of real-world location 1206. Since salient point 1208 was tracked from a previous Image A 1202 (e.g., illustrated in FIGS. 12A-12B), the display device has access to a real-world location of the salient point 1208. That is, map-to-frame tracking has already been performed on previous Image A 1202, and thus a real-world location 1206 is identified. As described in FIGS. 11-12B, salient points have been accurately tracked from the previous Image A 1202 to the current Image B 1204. Thus, the display device can identify that tracked salient point 1208 corresponds to the same real-world location 1206 as its matching salient point in the previous Image A 1202 (e.g., salient point 1208 illustrated in FIG. 12A). The display device can therefore compare descriptors of real-world salient points within a threshold distance of location 1206 to the descriptor generated for tracked salient point 1208. In this way, a real-world salient point can be matched to tracked salient point 1208.

With respect to newly extracted salient point 1402, the display device can identify that the salient point 1402 is likely within a threshold real-world distance of real-world location 1404. For example, the display device can utilize map information, optionally along with a pose estimate for Image B 1204, to identify an initial estimate for a real-world location of salient point 1402. That is, the display device can access information indicating a pose of previous Image A 1202 and adjust the pose according to the pose estimate. Optionally, the pose estimate can be refined according to the techniques described in FIG. 10A. The display device can then determine an initial estimate for a real-world location that corresponds to the 2D location of salient point 1402 based on the adjusted pose. As will be described below, via descriptor matching, the real-world location for salient point 1402 can be determined. The initial estimate (e.g., real-world location 1404) can therefore enable a reduction in a number of comparisons between a descriptor for salient point 1402 and descriptors of salient points indicated in the map information.

With reference again to FIG. 14A, the display device matches descriptors of salient points (block 1308). The display device can compare descriptors of salient points indicated in the map information with the descriptors generated for each salient point in the current image (e.g., as described in block 1304) to find an appropriate match.

As described above, initial projections of salient points indicated in the map information onto the current image can be identified. As an example, multitudes of real-world salient points may be proximate to real-world location 1404. The display device can compare descriptors for these multitudes of salient points with the descriptor generated for tracked salient point 1402. Thus, the initial projection can enable a reduction in comparisons that need to be performed as it allows the display device to identify a likely real-world location of salient point 1402. The display device can match descriptors that are most similar, for example based on one or more similarity measures (e.g., a difference in histogram, shape, color, texture, and so on). In this way, the display device can determine real-world locations corresponding to each salient point included in the current Image B 1204.

The display device can then determine its pose, as described in FIG. 10A. Subsequently, the display device can generate a patch for each salient point included in the current Image B 1204. Since these salient points will be tracked in a subsequent image, the patch will be utilized to perform frame-to-frame tracking as described above.

Figure 14B:
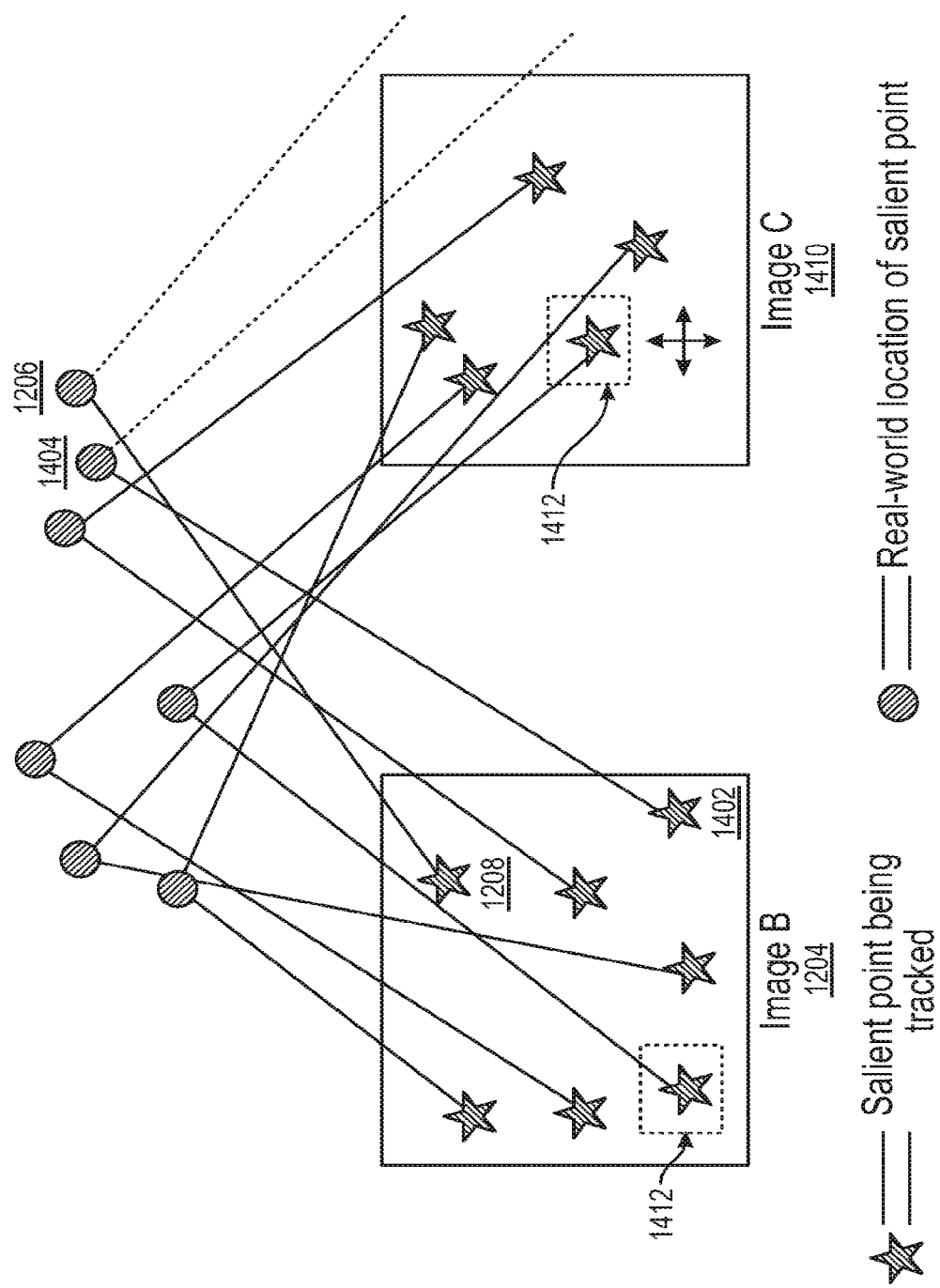
FIG. 14B illustrates an example of frame-to-frame tracking after map-to-frame tracking.

For example, FIG. 14B illustrates frame-to-frame tracking after map-to-frame tracking. In the example illustration, Image B 1204 (e.g., the current image in FIGS. 12A-B and 14A-B) now represents a previous image, and Image C 1410 represents a current image. In this example, salient point 1412 is projected onto the current Image C 1410. That is, a patch associated with salient point 1412, for example, generated subsequent to the display device determining its pose as described above, can be projected onto the current Image C 1410. Optionally, and as described in FIG. 10A, the patch associated with salient point 1412 can be a same patch as obtained in previous Image A 1202.

Thus, frame-to-frame tracking can be performed by the display device. Similar to the above description, current Image C 1410 can then be analyzed, and any image areas of current Image C 1410 with less than a threshold measure of tracked salient points can be identified. Map-to-frame tracking can then be performed, and a new pose determined.

Figure 15:
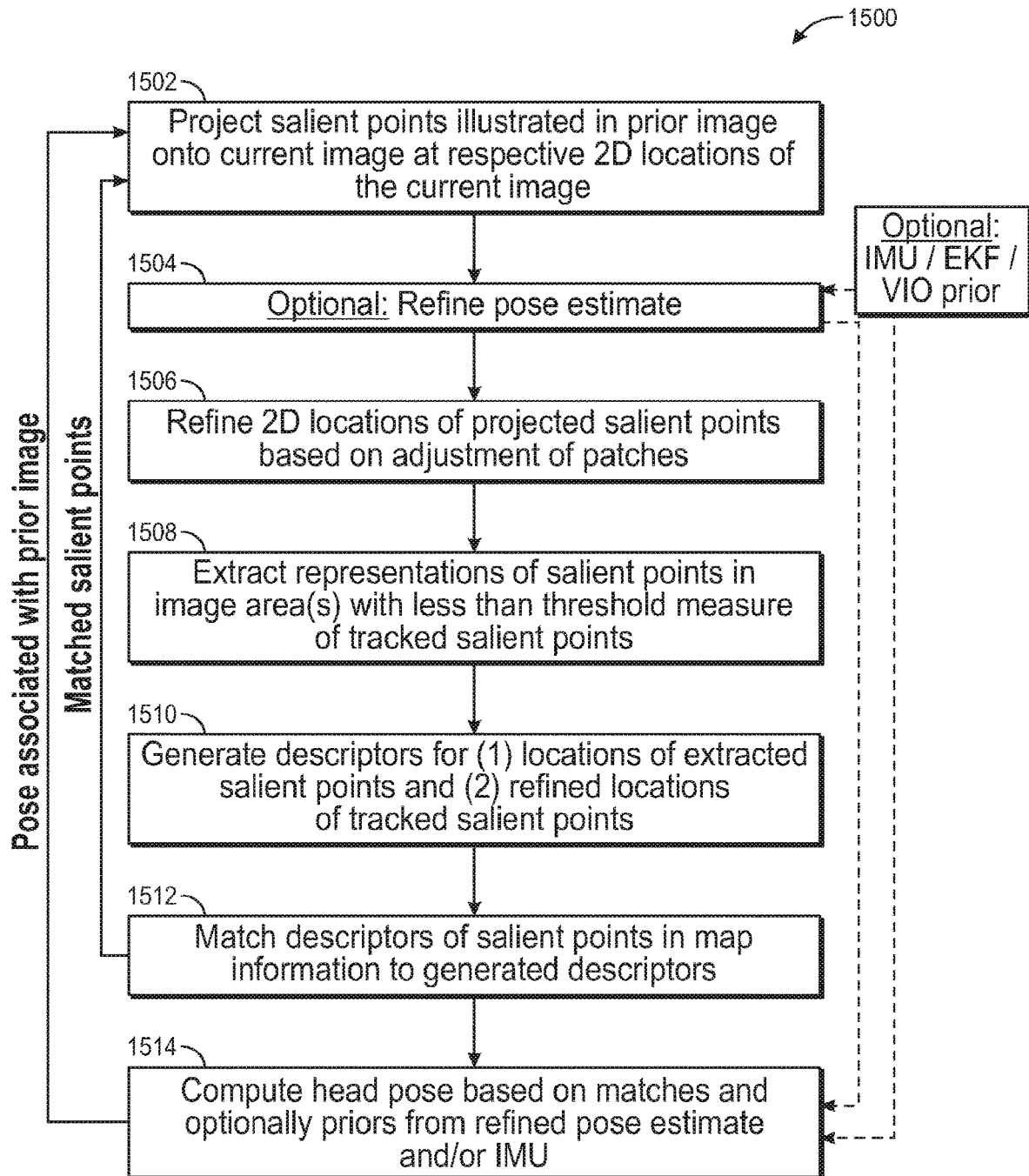
FIG. 15 illustrates a flowchart of an example process for determining head pose.

FIG. 15 illustrates a flowchart of an example process for determining head pose. For convenience, the process 1500 may be described as being performed by a display device (e.g., the display system 60), which may include processing hardware and software, and optionally may provide information to an outside system of one or more computers for processing, for example to offload processing to the outside system, and receive information from the outside system. In some embodiments, the display device may be a virtual reality display device comprising one or more processors.

The display device projects tracked salient points onto the current image at block 1502. As described above, with respect to FIG. 10A, the display device can track two-dimensional image locations of salient points between images obtained via one or more imaging devices. For example, a particular corner may be included in (e.g., illustrated in) a first image at a particular two-dimensional (2D) location of the first image (e.g., one or more pixels of the first image). Similarly, the particular corner may be included in a second image at a different 2D location of the second image. As described above, the display device can determine that the particular 2D location of the first image corresponds to the different 2D location of the second image. For example, these different 2D locations each illustrate the particular corner, and the particular corner has therefore been tracked between the first image and second. A correspondence between the first image and second image can be determined according to these tracked salient points.

As illustrated in FIG. 15, an output of block 1514, in which a head pose is computed for the previous image, is obtained by the display device for utilization in block 1502. Additionally, matched salient points are obtained by the display device for utilization in block 1502. Thus, in this example the display device has access to a prior computed head pose of a user and information associated with the salient points which are to be tracked from the previous image to the current image. The information, as described above, can include real-world locations of the salient points and respective patches associated with the salient points (e.g., an M×N image area of the previous image surrounding a salient point). As will be described, the information can be utilized to track salient points.

In block 1502, the display device obtains a current image (e.g., as described in FIG. 10A above) and projects salient points included in (e.g., illustrated in) a previous image onto the current image, or alternatively projects salient points from a map to a current image. The display device can identify an initial estimated location in the current image to which each salient point corresponds. For example, FIG. 14B illustrates an example salient point 1412 being represented at a 2D location of previous Image B 1204. This example salient point 1412 is then projected onto current Image C 1410. For example, the display device can utilize the pose computed for the previous image (e.g., block 1514), a pose estimate for the current image, and real-world locations of the salient points included in (e.g., illustrated in) the previous image. The pose estimate, as described above, can be based on a trajectory prediction and/or inertial measurement unit (IMU) information. IMU information is optional, but in some embodiments, may improve the pose estimate relative to trajectory prediction or trajectory prediction alone. In some embodiments, the pose estimate could be the same pose as derived from the previous image. The display device can utilize the pose estimate to adjust the pose computed for the previous image. Since the display device has access to real-world locations of the salient points, the display device can project these real-world locations onto the two-dimensional current image based on the adjusted pose.

Thus, the display device can estimate 2D locations of the current image that correspond to respective salient points. As described above, the display device can store a patch for each salient point being tracked. A patch can be an M×N image area surrounding a 2D location of an image that illustrates a salient point. For example, the patch can extend a set number of pixels along a horizontal direction of an image from a 2D location of a salient point. Similarly, the patch can extend a set number of pixels along a vertical direction of the image from the 2D location of the salient point. The display device can obtain a patch associated with each salient point, for example an M×N image area of the previous image surrounding each patch. Each obtained patch can then be projected onto the current image. As an example, a patch associated with a particular salient point may be obtained. The patch can be projected onto the current image as surrounding an estimated 2D location of the particular salient point. As described above, the 2D location of the projected patches can be adjusted based on photometric error minimization. With respect to the example of the particular salient point, the display device can determine an error between the patch and an M×N area of the current image on which the patch was projected. The display device can then adjust a location of the patch (e.g., along a vertical and/or horizontal direction) until the error is reduced (e.g., minimized) as disclosed herein.

The display device may optionally refine the pose estimate at block 1504. While an initial pose estimate may be determined, as described above, optionally the display device may refine the pose estimate. The display device can utilize the refined pose estimate as a prior when computing head pose (e.g., the refined pose estimate may be associated with a cost function).

As described in FIG. 10A, the display device can minimize a combined photometric cost function of all projected patches by varying a pose estimate of the current image. Due to the varying pose estimate, the estimated 2D locations of the current image that correspond to respective salient points will be adjusted. Therefore, patches projected onto the current image may be globally adjusted according to the varying pose estimates. The display device varies the pose estimate until a minimum combined error (e.g., global or local minimum, minimum less than a threshold, and so on) between the projected patches and the corresponding image areas of the current image is identified. As illustrated in the process 1500, inertial measurement unit information, extended kalman information (EKF), visual-inertial odometry (VIO) information, and so on, may be utilized as a prediction when refining the pose estimate.

The display device refines 2D locations of the projected salient points at block 1506. As described above, the display device can project a patch (e.g., an image area of the previous image surrounding a salient point) onto the current image. The display device can then compare (1) the patch and (2) an M×N image area of the current image on which the patch is projected. Initially, the display device can compare a patch associated with a salient point and an M×N image area of the current image which surrounds the salient point. Subsequently, the display device can adjust the M×N image area along a vertical direction (e.g., upwards or downwards in the current image) and/or a horizontal direction (e.g., to the left or right in the current image). For each adjustment, the patch can be compared to the new M×N image area, and an error determined. For example, the error can represent a sum of pixel intensity differences between corresponding pixels in the patch and the M×N image area (e.g., a difference between a top left pixel of the patch and a top left pixel of the image area can be computed, and so on). According to an error minimization scheme, such as Levenberg-Marquardt as described above, the display device can identify an M×N image area of the current image which minimizes the error with the patch. A 2D location of the current image that is surrounded by the identified M×N image area can be identified as a salient point associated with the patch. Thus, the display device can track the 2D locations of the salient point between the previous image and current image.

The display device extracts salient points in image area(s) with less than a threshold measure of tracked salient points at block 1508. As described above, with respect to FIGS. 10A-10B, the display device can identify image areas of the current image for which new salient points are to be identified. An extraction process, such as Harris corner detection, can be applied to the current image, and 2D locations of the current image which correspond to new salient points can be identified.

The display device subsequently generates descriptors for salient points included in the current image at block 1510. The display device can generate descriptors based on the 2D locations of the current image that correspond to salient points. The salient points include salient points tracked from the previous image to the current image, and salient points newly identified in the current image. As an example, a descriptor for a particular salient point can be generated based on pixel(s) associated with a 2D location of the particular salient point, or based on an image area surrounding the 2D location.

The display device matches descriptors included in map information to the generated descriptors at block 1512. As described above in FIG. 13, the display device can access map information and match descriptors included in the map information to the generated descriptors. The map information can include real-world coordinates (e.g., 3D coordinates) of salient points, along with descriptors associated with these real-world coordinates. Therefore, a match between a map information descriptor and a generated descriptor indicates real-world coordinates of a salient point associated with the generated descriptor.

To match descriptors, the display device can compare descriptor(s) included in the map information to each descriptor generated for a salient point included in the current image. To limit the number of comparisons that are performed, the display device can estimate real-world locations of the salient points included in the current image. For example, the salient points tracked from the previous image to the current image have known real-world coordinates. As another example, real-world coordinates of the salient points newly identified in the current image can be estimated according to the pose estimate of the display device. Therefore, the display device can use these estimated real-world coordinates to identify portions of the real-world environment in which each salient point is estimated to be included. For example, a particular salient point included in the current image can be determined to have estimated real-world coordinates. The display device can compare a descriptor generated for this particular salient point to descriptors included in the map information associated with real-world coordinates within a threshold distance of the estimated real-world coordinates. Thus, a number of comparisons between descriptors included in the map information and the generated descriptors can be reduced, as the display device can focus the comparisons.

The display device computes head pose at block 1514. As described above, the display device can compute head pose based on the real-world coordinates of the salient points included in the current image and their corresponding 2D locations in the current image. For example, the display device can perform a perspective-n-point algorithm using camera information of an imaging device (e.g., intrinsic camera parameters). In this way, the display device can determine a camera pose of the imaging device. The display can then linearly transform this camera pose to determine head pose of the user. For example, a translation and/or rotation of the user's head with respect to the camera pose can be computed. The user's head pose can then be utilized by the display device for a subsequent image, for example the head pose can be utilized in block 1502.

Optionally, the display device can utilize the refined pose estimate, as described in block 1504, as a prior when computing head pose. Additionally, the display device can utilize inertial measurement unit information, extended kalman filter information, inertial visual-odometry information, and so on, as priors.

Computer Vision to Detect Objects in Ambient Environment

As discussed above, the display system may be configured to detect objects in, or properties of, the environment surrounding the user. The detection may be accomplished using a variety of techniques, including various environmental sensors (e.g., cameras, audio sensors, temperature sensors, etc.), as discussed herein. For example, an object may represent a salient point (e.g., a corner).

In some embodiments, objects present in the environment may be detected using computer vision techniques. For example, as disclosed herein, the display system's forward-facing camera may be configured to image the ambient environment and the display system may be configured to perform image analysis on the images to determine the presence of objects in the ambient environment. The display system may analyze the images acquired by the outward-facing imaging system to perform scene reconstruction, event detection, video tracking, object recognition, object pose estimation, learning, indexing, motion estimation, or image restoration, etc. As other examples, the display system may be configured to perform face and/or eye recognition to determine the presence and location of faces and/or human eyes in the user's field of view. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

One or more of these computer vision techniques may also be used together with data acquired from other environmental sensors (such as, e.g., microphone) to detect and determine various properties of the objects detected by the sensors.

As discussed herein, the objects in the ambient environment may be detected based on one or more criteria. When the display system detects the presence or absence of the criteria in the ambient environment using a computer vision algorithm or using data received from one or more sensor assemblies (which may or may not be part of the display system), the display system may then signal the presence of the object.

Machine Learning

A variety of machine learning algorithms may be used to learn to identify the presence of objects in the ambient environment. Once trained, the machine learning algorithms may be stored by the display system. Some examples of machine learning algorithms may include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models may be customized for individual data sets. For example, the wearable device may generate or store a base model. The base model may be used as a starting point to generate additional models specific to a data type (e.g., a particular user), a data set (e.g., a set of additional images obtained), conditional situations, or other variations. In some embodiments, the display system may be configured to utilize a plurality of techniques to generate models for analysis of the aggregated data. Other techniques may include using pre-defined thresholds or data values.

The criteria for detecting an object may include one or more threshold conditions. If the analysis of the data acquired by the environmental sensor indicates that a threshold condition is passed, the display system may provide a signal indicating the detection of the presence of the object in the ambient environment. The threshold condition may involve a quantitative and/or qualitative measure. For example, the threshold condition may include a score or a percentage associated with the likelihood of the object being present in the environment. The display system may compare the score calculated from the environmental sensor's data with the threshold score. If the score is higher than the threshold level, the display system may detect the presence of the reflection and/or object. In some other embodiments, the display system may signal the presence of the object in the environment if the score is lower than the threshold. In some embodiments, the threshold condition may be determined based on the user's emotional state and/or the user's interactions with the ambient environment.

It will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (140), the remote processing module (150), and remote data repository (160). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

The foregoing specification has been described with reference to specific embodiments thereof. It will, however, be evident that various modifications and changes may be made thereto without departing from the broader spirit and scope of the disclosure. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A system comprising:
    one or more outwardly-facing imaging devices wearable by a user and configured to obtain images of a real-world environment in a vicinity of the user;
    one or more processors; and
    one or more computer storage media storing instructions that, when executed by the one or more processors, cause the one or more processors to perform operations comprising:
        identifying, in a current image of the real-world environment, a first salient point that was included in a prior image of the real-world environment, wherein the first salient point represents a first feature of the real-world environment;
        accessing respective descriptors for the first salient point and a second salient point identified in the current image, wherein the second salient point represents a second feature of the real-world environment, and wherein the system stores a descriptor-based map of the real-world environment indicating real-world locations associated with the first feature and the second feature; and
        determining, based on the accessed descriptors and the descriptor-based map, a pose of the system.

2. The system of claim 1, wherein identifying the first salient point in the current image of the real-world environment is accomplished by matching a portion of the current image with a patch stored by the system.

3. The system of claim 2, wherein the portion of the current image is matched with the patch stored by the system based on minimizing a cost function.

4. The system of claim 2, wherein the portion of the current image is matched with the patch using information from an inertial measurement unit of the system.

5. The system of claim 2, wherein matching the portion of the current image with the patch comprises projecting the patch onto the current image and refining a location associated with the patch.

6. The system of claim 1, wherein the descriptors are generated based on respective image pixels associated with respective locations of the first salient point and the second salient point in the current image.

7. The system of claim 1, wherein the descriptors are generated based on respective image areas associated with respective locations of the first salient point and the second salient point in the current image.

8. The system of claim 1, wherein the descriptor-based map includes a plurality of descriptors associated with a plurality of features, the features including the first feature and the second feature.

9. The system of claim 8, wherein the operations further comprise matching a subset of the plurality of descriptors with the accessed descriptors to identify at least a first descriptor and a second descriptor which match with the accessed descriptors.

10. The system of claim 9, wherein the descriptor-based map includes three-dimensional coordinates of salient points associated with the plurality of descriptors, and wherein the pose is based on comparing:
    (1) the three-dimensional locations associated with the first descriptor and the second descriptor; and
    (2) two-dimensional locations of the first salient point and the second salient point in the current image.

11. The system of claim 1, wherein the second salient point is extracted from the current image, and wherein extracting comprises:
    determining that an image area of the current image has less than a threshold number of salient points being tracked by the system; and
    extracting one or more additional salient points from the image area, the extracted salient points including the second salient point.

12. The system of claim 1, wherein the operations further comprise:
    projecting salient points included in the descriptor-based map onto the current image, wherein the projection is based on one or more of an inertial measurement unit, an extended kalman filter, or visual-inertial odometry.

13. A method implemented by a system including one or more outwardly-facing imaging devices wearable by a user and configured to obtain images of a real-world environment in a vicinity of the user, the method comprising:
   identifying, in a current image of the real-world environment, a first salient point that was included in a prior image of the real-world environment, wherein the first salient point represents a first feature of the real-world environment;
   accessing respective descriptors for the first salient point and a second salient point identified in the current image, wherein the second salient point represents a second feature of the real-world environment, and wherein the system stores a descriptor-based map of the real-world environment indicating real-world locations associated with the first feature and the second feature; and
   determining, based on the descriptors and the descriptor-based map, a pose of the system.

14. The method of claim 13, wherein identifying the first salient point in the current image of the real-world environment is accomplished by matching a portion of the current image with a patch stored by the system.

15. The method of claim 14, wherein the portion of the current image is matched with the patch stored by the system based on minimizing a cost function.

16. The method of claim 14, wherein the portion of the current image is matched with the patch using information from an inertial measurement unit of the system.

17. The method of claim 14, wherein matching the portion of the current image with the patch comprises projecting the patch onto the current image and refining a location associated with the patch.

18. The method of claim 13, wherein the descriptors are generated based on respective image pixels associated with respective locations of the first salient point and second salient point in the current image.

19. The method of claim 13, wherein the descriptors are generated based on respective image areas associated with respective locations of the first salient point and second salient point in the current image.

20. The method of claim 13, wherein the descriptor-based map includes a plurality of descriptors associated with a plurality of features, the features including the first feature and the second feature.

21. The method of claim 20, wherein the method further comprises matching a subset of the plurality of descriptors with the accessed descriptors to identify at least a first descriptor and a second descriptor which match with the accessed descriptors.

22. The method of claim 21, wherein the descriptor-based map includes three-dimensional coordinates of salient points associated with the plurality of descriptors, and wherein the pose is based on comparing:
   (1) the three-dimensional locations associated with the first descriptor and the second descriptor; and
   (2) two-dimensional locations of the first salient point and the second salient point in the current image.

23. The method of claim 13, wherein the second salient point is extracted from the current image, and wherein extracting comprises:
   determining that an image area of the current image has less than a threshold number of salient points being tracked by the system; and
   extracting one or more additional salient points from the image area, the extracted salient points including the second salient point.

24. The method of claim 13, further comprising:
   projecting salient points included in the descriptor-based map onto the current image, wherein the projection is based on one or more of an inertial measurement unit, an extended kalman filter, or visual-inertial odometry.

25. An augmented reality display system comprising:
   one or more outwardly-facing imaging devices wearable by a user and configured to obtain images of a real-world environment in a vicinity of the user; and
   one or more processors, the processors configured to:
   obtain a current image of the real-world environment;
   perform frame-to-frame tracking on the current image, such that patch-based salient points included in a previous image are matched with locations in the current image;
   perform map-to-frame tracking on the current image, wherein map-to-frame tracking comprises matching descriptors for the patch-based salient points with map-based descriptors stored in a descriptor-based map of the real-world environment; and
   determine a pose of the augmented reality display system.

26. The augmented reality display system of claim 25, wherein matching patch-based salient points with locations in the current image is based on minimizing a cost function.

27. The augmented reality display system of claim 25, wherein a subset of the map-based descriptors are determined to match with the descriptors for the patch-based salient points.

28. The augmented reality display system of claim 27, wherein the pose is based on comparing (1) real-world locations associated with the subset of the map-based descriptors and (2) two-dimensional locations of the patch-based salient points in the current image.

29. The augmented reality display system of claim 25, further comprising an inertial measurement unit (IMU), wherein the processors are configured to use the IMU to perform frame-to-frame tracking.

* * * * *